(12) United States Patent
Welscher et al.

(10) Patent No.: US 11,372,263 B2
(45) Date of Patent: Jun. 28, 2022

(54) BIFOCAL SPECTACLE LENS, COMPUTER IMPLEMENTED METHOD FOR CREATING A NUMERICAL REPRESENTATION OF SAME, COMPUTER PROGRAM, DATA PROCESSING SYSTEM, AND NON-VOLATILE COMPUTER READABLE STORAGE MEDIUM

(71) Applicants: Carl Zeiss Vision International GmbH, Aalen (DE); Ray Steven Spratt, Petaluma, CA (US)

(72) Inventors: Markus Welscher, Rainau (DE); Ray Steven Spratt, Petaluma, CA (US)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/566,897

(22) Filed: Dec. 31, 2021

(65) Prior Publication Data

US 2022/0121039 A1   Apr. 21, 2022

Related U.S. Application Data

(63) Continuation of application No. PCT/EP2020/070066, filed on Jul. 15, 2020.

(30) Foreign Application Priority Data

Jul. 16, 2019  (WO) ............... PCT/US2019/041939

(51) Int. Cl.
*G02C 7/02* (2006.01)
*G02C 7/06* (2006.01)

(52) U.S. Cl.
CPC ............ *G02C 7/024* (2013.01); *G02C 7/06* (2013.01); *G02C 7/066* (2013.01)

(58) Field of Classification Search
CPC .......... G02C 7/024; G02C 7/028; G02C 7/06; G02C 7/066
(Continued)

(56) References Cited

U.S. PATENT DOCUMENTS 6,089,713 A * 7/2000 Hof .................. B24B 9/146
                                            351/159.47
6,199,983 B1   3/2001 Komatsu et al.
(Continued)

FOREIGN PATENT DOCUMENTS

WO   2015120456 A1   8/2015
WO   2015150030 A1   10/2015

OTHER PUBLICATIONS

Ophthalmic optics—Spectacle lenses—Vocabulary (ISO 13666:2012); German and English version EN ISO 13666:2012, Oct. 2013.
(Continued)

*Primary Examiner* — James R Greece
(74) *Attorney, Agent, or Firm* — Tautz & Schuhmacher LLC; Georg Hasselmann

(57) ABSTRACT

A bifocal spectacle lens and a method for creating a numerical representation of a bifocal spectacle lens are disclosed. The bifocal spectacle lens includes a distance portion, a near portion, and a transition section situated between the distance portion and the near portion. The distance portion is optimized in view of an optical power for distance vision and the near portion is optimized in view of an optical power for near vision. The transition section is determined such that the transition section creates a continuous transition between the distance portion and the near portion. The distance portion and the near portion are optimized independently of one another and put together with the transition section to form the numerical representation of the bifocal spectacle lens.

22 Claims, 9 Drawing Sheets

(58) Field of Classification Search
USPC .................................................. 351/159.42
See application file for complete search history.

(56) References Cited

U.S. PATENT DOCUMENTS

| | | |
|---|---|---|
| 8,177,361 B2 | 5/2012 | Sessner et al. |
| 8,297,751 B2 | 10/2012 | Spratt et al. |
| 8,308,295 B2 | 11/2012 | Blum et al. |
| 9,618,774 B2 | 4/2017 | Carmon et al. |
| 2003/0142265 A1 | 7/2003 | Fresco |

OTHER PUBLICATIONS

International Search Report and Written Opinion issued in PCT/EP2020/070066, to which this application claims priority, dated Oct. 23, 2020 (In English).
International Preliminary Report on Patentability issued in PCT/EP2020/070066, to which this application claims priority, dated Oct. 29, 2021 (In English).

\* cited by examiner

BIFOCAL SPECTACLE LENS, COMPUTER IMPLEMENTED METHOD FOR CREATING A NUMERICAL REPRESENTATION OF SAME, COMPUTER PROGRAM, DATA PROCESSING SYSTEM, AND NON-VOLATILE COMPUTER READABLE STORAGE MEDIUM

CROSS REFERENCE TO RELATED APPLICATIONS

This application is a continuation application of international patent application PCT/EP2020/070066, filed Jul. 15, 2020, designating the United States and claiming priority from international patent application PCT/US2019/041939, filed Jul. 16, 2019, and the entire content of both applications is incorporated herein by reference.

TECHNICAL FIELD

The present disclosure relates to a computer implemented method for creating a numerical representation of a bifocal spectacle lens with a distance portion for distance vision, a near portion for near vision and a transition section, and a bifocal spectacle lens represented by such a numerical representation. Additionally, the disclosure relates to a computer program for creating a numerical representation of a bifocal spectacle lens, a data processing system for creating a numerical representation of a bifocal spectacle lens and a non-volatile computer readable storage medium with instructions stored thereon for creating a numerical representation of a bifocal spectacle lens.

BACKGROUND

Bifocal spectacle lenses are spectacle lenses with a distance portion for distance vision and a near portion for near vision, with the near portion being arranged in a section of the spectacle lens that represents a lower portion of the spectacle lens when the spectacles are worn. Usually, the near portion is a circular section with a straight or bent (in c-shaped fashion) upper separating line to the distance portion; however, it may also be embodied as a round near portion, i.e., a near portion whose separating line to the distance portion forms a single circular arc, or as an executive spectacle lens. Here, an executive spectacle lens should be understood to mean a spectacle lens in which the lower half is embodied virtually completely as a near portion and there is a straight separating line, extending over the entire spectacle lens, delimiting this from the upper half, which serves as the distance portion.

In the case of mineral glasses, the near portion in the form of a higher refractive glass material can be smelted into a main glass as a segment such that, in this case, a purely spherical front surface can continue to be present. In the case of polymer lenses, the front surface of the near portion, as a rule, is elevated in relation to the front surface of the distance portion and cast from the same material as the distance portion. The optical quality of bifocal spectacle lenses is often not satisfying since, contingent upon the most frequent fitting, specifically the fitting of the upper separating line of the near portion to the level of the lower edge of the iris, the tilt of the spectacle lens in front of the eye cannot be taken into account in the production of semi-finished products. Not even the pantoscopic tilt is taken into account, as is even taken into account, for example, in the case of simple spherical single vision spectacle lenses during the fit according to the requirement of the center of rotation of the eye. The requirement of the center of rotation of the eye in the case of spherical single vision spectacle lenses demands that the optical axis of the spectacle lens extends through the center of rotation of the eye. This is achieved if the spectacle lens is centered in relation to the eye in such a way that an object-side chief ray passes perpendicular through the convexly curved surface of the spectacle lens, which is typically the spectacle lens front surface, when looking through the reference point of the spectacle lens. Moreover, bifocal spectacle lenses are aspherized neither for the power according to the prescription nor for standard centration and frame data. Furthermore, the clearly visible near portions and edges, which are moreover raised in the case of polymers, are not aesthetically pleasing.

U.S. Pat. No. 9,618,774 B2 has disclosed a bifocal spectacle lens in which a transition section is present between the near portion and the distance portion, the transition section usually being embodied as a progressive zone but which, alternatively, may also be without an optical function. A continuous transition between the distance portion and the near portion can be achieved by this transition section. The bifocal spectacle lens described in U.S. Pat. No. 9,618,774 B2 can be produced by means of free-form technology. As a rule, a numerical representation of the spectacle lens is created within the scope of the free-form technology, this numerical representation of the spectacle lens containing at least one numerical representation of a free-form surface. Here, the numerical representation of the free-form surface is typically determined by an optimization method, in which an initial spectacle lens with a free-form surface to be varied, which is typically the back surface, and a target design to be achieved are predetermined. The free-form surface to be varied is then varied until the properties obtained by the corresponding spectacle lens deviate from the properties defined by the target design by no more than a predetermined measure. The representation of the spectacle lens optimized thus can serve as a data model for producing the spectacle lens by means of the CNC method within the scope of the free-form technology.

SUMMARY

In relation to the described related art, it is an object of the present disclosure to make available an advantageous method for creating a numerical representation of a bifocal spectacle lens. Further objects of the present disclosure consist of making available a computer program, a data processing system and a non-volatile computer readable storage medium, which can find use for the advantageous creation of a numerical representation of a bifocal spectacle lens. Moreover, it is an object of the disclosure to make available an advantageous bifocal spectacle lens.

The first object is achieved by a computer implemented method for creating a numerical representation of a bifocal spectacle lens wherein the distance portion and the near portion are optimized independently of one another. The remaining objects are achieved by a computer program, a data processing system, a non-volatile computer readable storage medium, and a bifocal spectacle lens as disclosed herein. Exemplary embodiments of the disclosure are discussed below.

According to the disclosure, a computer implemented method for creating a numerical representation of a bifocal spectacle lens with a distance portion, i.e., a portion for distance vision, a near portion, i.e., a portion for near vision, and a transition section situated between the distance portion and the near portion is provided. In the method, the distance portion is optimized in view of optical power for distance vision and the near portion is optimized in view of optical power for near vision. The transition section is determined or optimized in such a way that the latter creates a continuous transition between the distance portion and the near portion. Within the scope of the present disclosure, the distance portion and the near portion are optimized independently of one another and subsequently put together with the transition section to form the numerical representation of the bifocal spectacle lens. The transition section is determined or optimized after the distance portion and the near portion have been optimized. However, within the scope of the independent optimizations, it is advantageous if boundary conditions that are matched to one another are used in view of the thickness of the respective portion and the base curve of the front surface. Here, the distance portion and the near portion can each be individually optimized for a predetermined working distance.

There are a number of methods for determining the transition section. These include blending, interpolation, and optimization. Blending calculates a linear combination of two surfaces, here the surfaces of the distance portion and the near portion after they have been optimized, in a region of overlap of the surfaces. The sum of the coefficients multiplying the individual heights of the two surfaces typically equals one at every point in the transition section. Interpolation, on the other hand, uses only information available at the boundaries of the transition section to calculate a section of surface to bridge the gap between the surfaces of the distance portion and the near portion. An optimization typically minimizes some feature of the transition section, such as the root mean square (RMS) astigmatism for example, while preserving the surface heights of the surfaces of the distance portion and the near portion.

The representation of the bifocal spectacle lens created on the basis of the method according to the disclosure facilitates the production of the bifocal spectacle lens using free-form technology, wherein there are greater freedoms for the optimization of the distance portion and the near portion in comparison with the method described in U.S. Pat. No. 9,618,774 B2. As a result of the distance portion and the near portion being optimized largely independently of one another, the respective portion can be accurately fitted to the power required according to the prescription without the fitting being restricted by the respective other portion, as would be the case if both portions and the transition portion were to be optimized together. Here, the transition section facilitates putting together of the surfaces of the distance portion and the near portion in such a way that a continuous transition is present. The surface representing the near portion and the surface representing the distance portion which, like the transition section, can be described by locally defined functions can be put together with the aid of the transition section to form a continuous surface typically described by locally defined functions such that the resultant bifocal spectacle lens is accessible to the production by means of free-form technology. The production by means of free-form technology allows, in particular, conditions of use and frame data also to be taken into account in addition to the prescription-related effects for the spectacle wearer. Consequently, the method according to the disclosure facilitates the production of bifocal spectacle lenses and, in particular, individualized bifocal spectacle lenses by means of free-form technology, without this being accompanied by restrictions in the optimization of distance portion and near portion. Moreover, the transition section can be determined such that it is undetectable by an outside observer, is optically acceptable to the wearer, and can be produced by existing free-form technology.

The production by means of free-form technology moreover facilitates the use of simple spherical semi-finished products during the manufacture, as also occurs in progressive addition lenses or single vision spectacle lenses produced by free-form technology, but as may also occur in the case of spherical single vision spectacle lenses. As a result, storage and production costs can be lowered. Moreover, the imaging quality of bifocal spectacle lenses can be improved in the case of a production by means of free-form technology. Moreover, an improvement in the imaging quality can be brought about by aspherization of the bifocal spectacle lens according to base curves. In the simplest case, an asphere could be implemented for the distance portion in a manner analogous to the aspherization according to base curves used in conventional single vision spectacle lenses, with the base curve describing the nominal surface refractive index (or the nominal curvature) of the spectacle lens front surface. A further improvement in the optics could be obtained by adding the aspherization of the near portion likewise as per an aspherization according to base curves, with that aspherization being optimized for a near object distance. A next step to improving the imaging quality would lie in an aspherization according to standard conditions of use, as find use in non-individualized progressive addition lenses. Moreover, the optimization for individual conditions of use would lead to a further improvement in the optical properties. If, moreover, individual wavefront measurements of the eye are included in the manufacturing process, a bifocal spectacle lens produced by means of the method according to the disclosure can be optimized for the respective wearer In the method according to the disclosure, it is advantageous if the transition section between the distance portion and the near portion is fitted in such a way that a continuously differentiable transition is created between the transition section and the distance portion and between the transition section and the near portion. As a result, it is possible to avoid not only protrusions or recesses in a surface, but kinks as well.

In particular, the distance portion and the near portion can each be optimized by virtue of a numerical representation of a spectacle lens for distance vision and a numerical representation of a spectacle lens for near vision, and the numerical representation of the bifocal spectacle lens can be created by putting it together from a segment of the optimized numerical representation of the spectacle lens for distance vision, a segment of the optimized numerical representation of the spectacle lens for near vision and the transition section. In this way, conventional optimization methods for spectacle lenses for distance vision spectacles and for spectacle lenses for near vision spectacles can find use within the scope of the method according to the disclosure. Here, a numerical representation of a single vision spectacle lens can be used in particular as a numerical representation of the spectacle lens for distance vision, rendering the optimization particularly simple. Likewise, a single vision spectacle lens can be used as the numerical representation of the spectacle lens for near vision such that the optimization of the near portion is also particularly simple. As an alternative to the use of a numerical representation of single vision spectacle lens, a numerical representation of a near comfort spectacle lens, sometimes also referred to as a near region spectacle lens, can be used as numerical representation of the spectacle lens for near vision. In this case, the near portion can be designed in the style of a progressive addition lens. Such a near portion is advantageous, in particular, if the near portion has a high addition (difference between the vertex power of the near portion and the vertex power of the distance portion, measured under specified conditions pursuant to DIN ISO 13666:2013-10, section 14.2.1) in relation to the distance portion. As a result, the bifocal spectacle lens becomes usable for a greater range of near working distances, whereas the intermediate regions of progressive addition lenses are often poorly usable in the corresponding working distances in the case of such high additions.

Within the scope of the method according to the disclosure, putting together the distance portion and the near portion and the transition section can be implemented in such a way, in particular, that the distance portion and the near portion touch at exactly one contact point. For this purpose, the distance portion and the near portion are optimized under the boundary condition that they have the same thickness at the contact point. In this way, the near portion can reach to the distance portion. However, such an optimization may not be possible in the case of a high addition in the near portion in relation to the distance portion. In this case, or if a contact point is unwanted between the distance portion and the near portion, the distance portion, the near portion and the transition section can be put together in such a way that the distance portion and the near portion in each case only adjoin the transition section. Since the boundary condition that the near portion and the distance portion must have a point with the same thickness is removed in this case, this configuration is also advantageous to the extent that there is a less limiting restriction in view of the thickness when optimizing the distance portion and the near portion. However, it is desirable for differences in the thickness of the distance portion and the thickness of the near portion not to be too great so that the transition section need not bridge differences in the thickness that are too great. In particular, this can be achieved if use is made in the independent optimizations of boundary conditions, matched to one another, in view of the thickness of the respective portion and typically also in view of the base curve of the front surface.

In the method according to the disclosure, it is advantageous if use is made of a transition section that, proceeding from a central section of the numerical representation of the optimized bifocal spectacle lens, becomes wider toward the edge of the numerical representation of the optimized bifocal spectacle lens. As a rule, the distance portion and the near portion can be optimized in such a way that they have a similar thickness in a central region and, optionally, even have the same thickness at one point. As a result, a transition section with a thinner width is possible in a central region than in the peripheral regions that, on account of the different surface curvatures of the distance portion and the near portion, differ ever more from one another in terms of their thickness in relation to the central region. Increasing the transition width toward the edge can avoid the transition becoming significantly steeper at the edge of the numerical representation of the lens than in the center.

In the method according to the disclosure the transition section may be determined by providing an overlap region between the distance portion and the near portion where a surface of the overlap region is a linear combination of a surface of the distance portion and a surface of the near portion in the overlap region. This is an easy and effective way of determining a smooth transition section. The linear combination in the overlap region may be given at any point in the transition section by a sum of the height of the surface of the distance portion at a point in the transition section multiplied by first coefficient and the height of the surface of the near portion at this point multiplied by a second coefficient where the sum of the first coefficient and the second coefficient equals one at every point in the transition section so that the surface of the transition section can smoothly pass over into the surfaces of the distance portion and the near portion.

According to a second aspect of the present disclosure, a computer program for creating a numerical representation of a bifocal spectacle lens with a distance portion, i.e., a portion for distance vision, and a near portion, i.e., a portion for near vision, and a transition section situated between the distance portion and the near portion is provided. The computer program according to the disclosure comprises instructions that, when executed on a computer, prompt the computer to optimize the distance portion in view of optical power for distance vision and the near portion in view of optical power for near vision. Furthermore, the instructions, when executed on a computer, prompt the computer to determine or optimize the transition section in such a way that the latter creates a continuous transition between the distance portion and the near portion. The computer program according to the disclosure is distinguished by virtue of the fact that the instructions, when executed on the computer, prompt the computer to optimize the distance portion and the near portion independently of one another and subsequently put these together with the transition section to form the numerical representation of the bifocal spectacle lens with continuous surfaces. The transition section is determined or optimized after the distance portion and the near portion have been optimized. However, within the scope of the independent optimizations, it is advantageous if boundary conditions that are matched to one another are used in view of the thickness of the respective portion and the base curve of the front surface.

According to a third aspect of the present disclosure, a data processing system for creating a numerical representation of the bifocal spectacle lens with a distance portion, i.e., a portion for distance vision, and a near portion, i.e., a portion for near vision, and a transition section situated between the distance portion and the near portion is provided. The data processing system according to the disclosure comprises a processor and at least one memory, wherein the processor is configured, on the basis of instructions of a computer program stored in the memory, to optimize the distance portion in view of optical power for distance vision and the near portion in view of optical power for near vision. Moreover, the processor is configured, on the basis of instructions of the computer program stored in the memory, to determine or optimize the transition section in such a way that the latter creates a continuous transition between the distance portion and the near portion. The data processing system according to the disclosure is distinguished by virtue of the fact that the processor is moreover configured, on the basis of the instructions of the computer program stored in the memory, to optimize the distance portion and the near portion independently of one another and subsequently put these together with the transition section to form the numerical representation of the bifocal spectacle lens. The transition section is determined or optimized after the distance portion and the near portion have been optimized. However, within the scope of the independent optimizations, it is advantageous if boundary conditions that are matched to one another are used in view of the thickness of the respective portions and the base curve of the front surface.

According to a fourth aspect of the present disclosure, a non-volatile computer readable storage medium with instructions stored thereon for creating a numerical representation of the bifocal spectacle lens with a distance portion, i.e., a portion for distance vision, and a near portion, i.e., for near vision, and a transition section situated between the distance portion and the near portion is provided. The instructions of the non-volatile computer readable storage medium according to the disclosure prompt a computer, when they are executed thereon, to optimize the distance portion in view of optical power for distance vision and the near portion in view of optical power for near vision. Moreover, they prompt the computer to determine or optimize the transition section in such a way that the latter creates a continuous transition between the distance portion and the near portion. The non-volatile computer readable storage medium according to the disclosure is distinguished by virtue of the fact that the storage medium moreover comprises instructions stored thereon, which instructions, when executed on the computer, prompt the computer to optimize the distance portion and the near portion independently of one another and subsequently put these together with the transition section to form the numerical representation of the bifocal spectacle lens. The transition section is determined or optimized after the distance portion and the near portion have been optimized. However, within the scope of the independent optimizations, it is advantageous if boundary conditions that are matched to one another are used in view of the thickness of the respective portion and the base curve of the front surface.

The computer program according to the second aspect of the present disclosure, the data processing system according to the third aspect of the present disclosure and the non-volatile computer readable storage medium according to the fourth aspect of the present disclosure render it possible to carry out the computer implemented method according to the disclosure on a computer and hence render it possible to implement the properties and advantages described with reference to the method.

A bifocal spectacle lens according to the disclosure comprises a distance portion, i.e., a portion for distance vision, a near portion, i.e., a portion for near vision, and a transition section situated between the distance portion and the near portion, which creates a continuous transition between the distance portion and the near portion. In the bifocal spectacle lens according to the disclosure, the distance portion and the near portion represent portions of spectacle lenses that were optimized independently of one another and subsequently put together with the transition section, where the transition section has been determined or optimized after the distance portion and the near portion have been optimized, so that the iso-astigmatism lines of the spectacle lens are discontinuous. Such a spectacle lens can be identified by discontinuous iso-astigmatism lines. However, it is advantageous if the spectacle lenses that are optimized independently of one another have boundary conditions matched to one another in view of the thickness of the respective portion and in view of the base curve of the front surface.

The bifocal spectacle lens according to the disclosure can be produced by means of free-form technology and, in comparison with bifocal spectacle lenses, facilitates an improvement in the imaging quality as described with reference to the computer implemented method according to the disclosure. Reference is made to this description in order to avoid repetition.

In the bifocal spectacle lens according to the disclosure, the near portion and distance portion can touch at exactly one point of the bifocal spectacle lens, as a result of which the near portion is brought particularly close to the distance portion.

In an advantageous configuration of the bifocal spectacle lens, the near portion can represent a portion of the near comfort spectacle lens such that the near portion is usable for a greater range of near distances.

The transition section of the inventive bifocal spectacle lens may be an overlap region between the distance portion and the near portion where a surface of the overlap region comprises, and in particular is, a linear combination of a surface of the distance portion and a surface of the near portion in the overlap region. This provides for an easily determinable smooth transition section. The linear combination in the overlap region is given at any point in the transition section by a sum of the height of the surface of the distance portion at a point in the transition section multiplied by first coefficient and the height of the surface of the near portion at this point multiplied by a second coefficient where the sum of the first coefficient and the second coefficient equals one at every point in the transition section so that the surface of the transition section can smoothly pass over into the surfaces of the distance portion and the near portion.

BRIEF DESCRIPTION OF THE DRAWINGS

The disclosure will now be described with reference to the drawings wherein.

DESCRIPTION OF EXEMPLARY EMBODIMENTS

Figure 1:
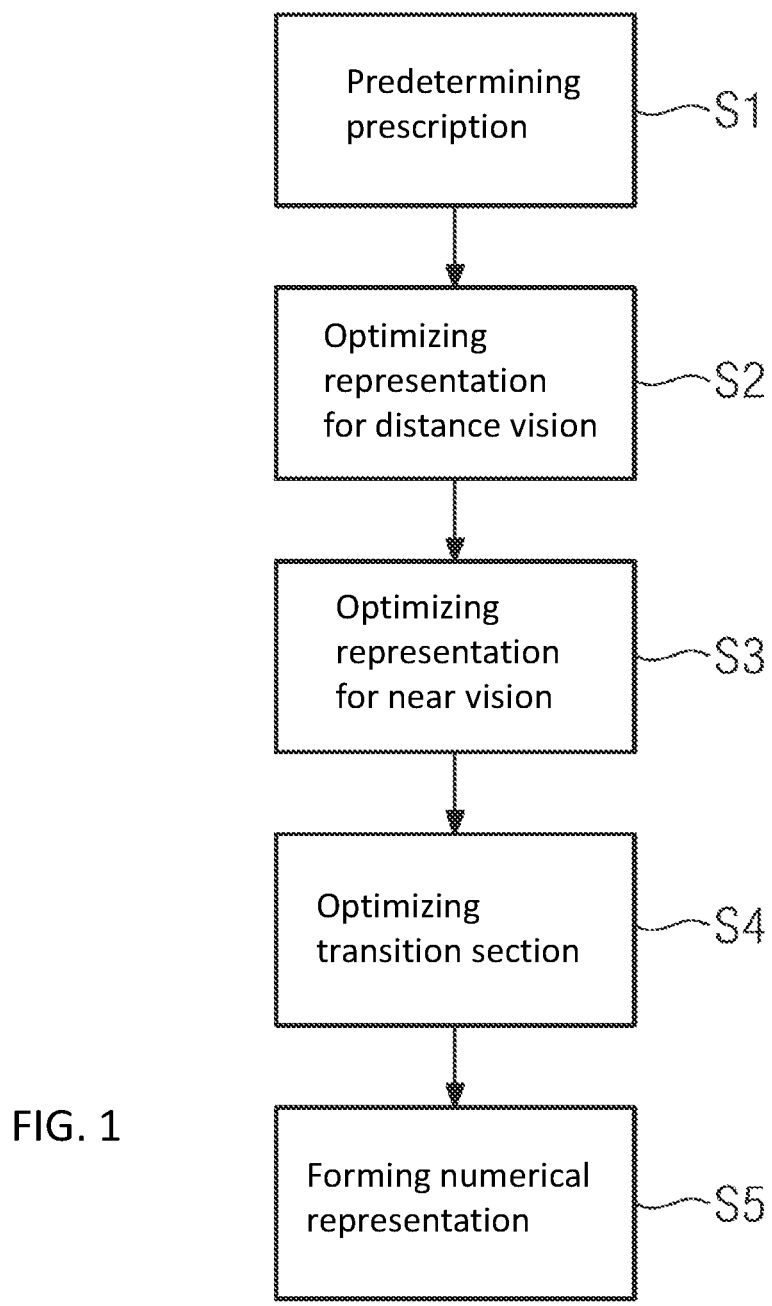
FIG. 1 shows a possible procedure for creating a numerical representation of a bifocal spectacle lens in the form of a flowchart.

The following definitions are used within the scope of the present description:

Base Curve

Pursuant to DIN ISO 13666:2013-10, section 11.4.2, the base curve specifies the nominal surface power (or the nominal curvature) of the one finished spectacle lens surface. Often, this finished spectacle lens surface is the spectacle lens front surface.

Bifocal Spectacle Lens

A bifocal spectacle lens is considered to be a spectacle lens in which, as a result of the construction, two different portions with different focusing powers are present, the focusing power in the one portion being designed for distance vision and the focusing power in the other portion being designed for near vision.

Distance Portion

The distance portion refers to that portion of a bifocal spectacle lens which has the dioptric power for distance vision (DIN ISO 13666:2013-10, section 14.1.1).

Near Portion

The near portion refers to that portion of a bifocal spectacle lens which has the dioptric power for near vision (DIN ISO 13666:2013-10, section 14.1.3).

Addition

The addition, also referred to as addition power, in this case specifies the difference between the vertex power of the near portion of a spectacle lens and the vertex portion of the distance portion of the spectacle lens, measured using a specified method (DIN ISO 13666:2013-10, section 14.2.1), with the vertex power representing the reciprocal of the paraxial back focus of the image-side focus, measured in meters. Here, the paraxial back focus represents the back focus for a paraxial beam. Within the scope of the present description, a beam is to be considered to be a paraxial beam if its diameter does not exceed 0.05 mm, in particular 0.01 mm.

Near Comfort Spectacle Lens

A near comfort spectacle lens is understood to mean a progressive addition spectacle lens that has at least one progressive addition zone and an increasing power when the spectacle wearer peers downward, with the entire spectacle lens being designed for near vision.

Dioptric Power

The term "dioptric power" forms a collective term for the focusing power and the prismatic power of a spectacle lens. The term "focusing power" in turn forms a collective term for the spherical power, which brings a paraxial pencil of parallel light to a single focus (DIN ISO 13666:2013-10, section 11.1) and which is usually considered in the prescription by the "sphere" value or, abbreviated, "sph," and the astigmatic power of a spectacle lens, which brings a paraxial pencil of parallel light to two separate line foci mutually at right angles (DIN ISO 13666:2013-10, section 12.1) and which is usually considered in the prescription by the "cylinder" value or, abbreviated, "cyl". Within the scope of the present description, a beam is to be considered to be a paraxial pencil of rays if its diameter does not exceed 0.05 mm, in particular 0.01 mm. Pursuant to DIN ISO 13666:2013-10, the value "sphere" denotes the image-side refractive power of a spectacle lens with spherical power or the vertex power in one of the two principal meridians of a spectacle lens with astigmatic power. Here, a principal meridian (DIN ISO 13666:2013-10, section 7.4) is that meridian plane of a surface which shows the maximum or minimum curvature on measurement, with the term "meridian plane" (DIN ISO 13666:2013-10, section 5.7.1) denoting a plane containing the center(s) of curvature of a surface. A principal meridian of a spectacle lens with astigmatic power is understood to mean, pursuant to DIN ISO 13666:2013-10, section 12.2, in particular, one of two mutually perpendicular meridian planes which are parallel to the two line foci. The cylinder value (DIN ISO 13666:2013-10, section 12.5) denotes the astigmatic difference which, pursuant to DIN ISO 13666:2013-10, section 12.4, is the difference between the vertex power in the first principal meridian and the vertex power in the second principal meridian of a spectacle lens with astigmatic power, in relation to the first or the second principal meridian. The direction of the principle meridian used as reference is characterized by the "axis" angle (DIN ISO 13666:2013-10, section 12.6). Pursuant to DIN ISO 13666:2013-10, section 12.2.1, the first principal meridian is the principal meridian with the lower refractive power in this case; the second principal meridian (DIN ISO 13666:2013-10, section 12.2.2) is the principal meridian with the higher refractive power.

Conditions of Use

The term "conditions of use" denotes the position and the orientation of the spectacles in relation to the eyes and the face of the wearer while the spectacles are worn. By way of example, the conditions of use can be specified by the "as worn" pantoscopic angle (DIN ISO 13666:2013-10, section 5.18), the face form angle (DIN ISO 13666:2013-10, section 17.3) and the vertex distance (DIN ISO 13666:2013-10, section 5.27) and are fitted to the respective wearer for each spectacle lens. Typical values for the "as worn" pantoscopic angle lie between −20 degrees and +30 degrees; typical values for the vertex distance lie in the range between 5 mm and 30 mm; and typical values for the face form angle lie in the range between −5 degrees and +15 degrees. In addition to the "as worn" pantoscopic angle, the face form angle and the vertex distance, the conditions of use, as a rule, also include the interpupillary distance (DIN ISO 13666:2013-10, section 5.29), i.e., distance between the centers of the pupils when the eyes are fixating an object at an infinite distance in the straight-ahead position, and the centration data, i.e., the dimensions and distances required to center the spectacle lens in front of the eye, and the object distance model, which sets the object distance for which a certain point on the spectacle lens surface is optimized. The conditions of use can be individual conditions of use, i.e., they are matched to a specific wearer, or general conditions of use, i.e., they are matched to defined group of wearers.

Gradient

The term "gradient" denotes the gradient in the mathematical sense. Within the scope of the present disclosure, the gradient is a vector which, at a point of a function describing an area, points in the direction of greatest slope of the function describing the area and the magnitude of which specifies the slope of the function describing the area in the direction of greatest change.

Principal Meridian

A principal meridian (DIN ISO 13666:2013-10, section 7.4) is that meridian plane of a surface which shows the maximum or minimum curvature on measurement, with the term "meridian plane" (DIN ISO 13666:2013-10, section 5.7.1) denoting a plane containing the center(s) of curvature of a surface.

Contact Point

A contact point within the meaning of the present disclosure is a point at which two sections of a spectacle lens immediately adjoin one another.

Numerical Representation of a Spectacle Lens

Within the meaning of the present disclosure, a numerical representation of a spectacle lens is a mathematical description of the spectacle lens for the purposes of carrying out an optimization by means of a computer-implemented method and for the purposes of producing a spectacle lens by means of a CNC process.

Optimizing a Spectacle Lens

Within the scope of the present disclosure, optimizing a spectacle lens means carrying out a computer-assisted process, in which the numerical representation of a spectacle lens is described with the aid of at least one parameterized function describing the numerical representation, typically with the aid of a plurality of parameterized functions, in which a target property to be achieved by the spectacle lens is predetermined and in which a target function is specified, the value(s) of which specifying a deviation of the property achieved by the current parameter value(s) of the parameterized function(s) from the target property, with the parameter value(s) of the parameterized function(s) being varied until the value(s) of the target function satisfies or satisfy a termination criterion that leads to the termination of the variation of the parameter value or of the parameter values.

Prescription

The term "prescription" denotes a summary in which the dioptric powers necessary for correcting a diagnosed refractive error are specified in the form of suitable values. In the case of spherical power, the prescription may contain a value "sph" for sphere. In the case of astigmatic power, the prescription can contain values "cyl" for cylinder and "axis" for axis, and, in the case of prismatic power, the prescription can contain a prism value. Moreover, the prescription may contain further values, for example the "add" value in the case of multifocal spectacle lenses, the "add" value specifying the difference between the vertex power in the near portion of the spectacle lens and in the distance portion of the spectacle lens. A value "PD" for the interpupillary distance may also be contained in the prescription.

Segment of a Spectacle Lens

Within the meaning of the present disclosure, a segment of a spectacle lens is a section of a spectacle lens, which may have any form within the scope of the disclosure.

Continuous Transition

A continuous transition within the meaning of the present disclosure is a transition that can be described by a function that is continuous in the mathematical sense. A function $f(x)$ is continuous at a point $x_0$ in the mathematical sense if, for all $\varepsilon > 0$ there exists a number $\delta(\varepsilon)$ such that for all $x$ of the neighbourhood of $x_0$ with $|x-x_0|<\delta$, it follows that $|f(x)-f(x_0)|<\varepsilon$ applies. If the derivative of the function $f(x)$ is also continuous, the function is denoted continuously differentiable.

Spectacle Lenses Optimized Independently of One Another

Spectacle lenses that are optimized independently of one another within the scope of the present disclosure are spectacle lenses that have been optimized in mutually independent optimization processes, wherein it may however be advantageous within the scope of the independent optimization processes if boundary conditions that are matched to one another in view of the thickness of the respective portion and the base curve of the front surface are used.

Transition Section of a Spectacle Lens

A transition section of a spectacle lens within the meaning of the present disclosure is a section of the spectacle lens that is situated between the near portion and the distance portion of the spectacle lens and that connects the spectacle lens surfaces of the near portion and of the distance portion by way of a continuous surface.

Target Design

A target design within the meaning of the present disclosure is the specification of a distribution of image aberrations over the spectacle lens or of surface properties of the spectacle lens, which should be achieved in an optimization process. In the first case, reference is made to an optical target design and reference is made to a surface target design in the second case. Accordingly, an optical target design is the specification of a distribution of image aberrations over the entire spectacle lens or else, there beyond, in the spectacle wearer beam path (e.g., astigmatic residual deviation, spherical residual deviation, prism, horizontal symmetry, distortion, or else higher order aberrations such as, e.g., coma). Additionally, the optical target design may contain specifications for the astigmatic and spherical residual deviations at reference points (e.g., distance design reference point or near design reference point) or the addition in the measurement beam path of a measuring device, e.g., in the beam path of a vertex power measuring device. By contrast, a surface target design specifies surface properties of the free-form surface to be formed that should be achieved in the optimization process, for example a surface power and a surface astigmatism. Here, the surface power is a measure for the ability of a surface section surrounding an optimization point to change the vergence (refractive index of the spectacle lens material divided by the radius of curvature of the wavefront) of a beam incident on the surface section from the air. The surface astigmatism at an optimization point represents the difference of the surface powers in the principal meridians at an optimization point of the surface. Provided the text below does not specifically refer to an optical target design or a surface target design but only to a target design, the term "target design" should always comprise both types of target design.

Putting Together a Numerical Representation of a Bifocal Spectacle Lens

Within the scope of the present disclosure, putting together a numerical representation of a spectacle lens means combining portions of numerical representations of at least two original spectacle lenses to form a numerical representation of a new spectacle lens using a transition section such that the numerical representation of the new spectacle lens in the portion parts in each case corresponds to the portion parts of the numerical representations of the original spectacle lenses.

Surface Height

The surface height represents the height of a surface above a (notional) flat plane. In a Cartesian coordinate system the surface height may be given by the value of a z-coordinate over of points a xy-plane.

Linear Combination

A linear combination is an expression constructed from a set of terms by multiplying each term by a constant and adding the results.

Figure 2:
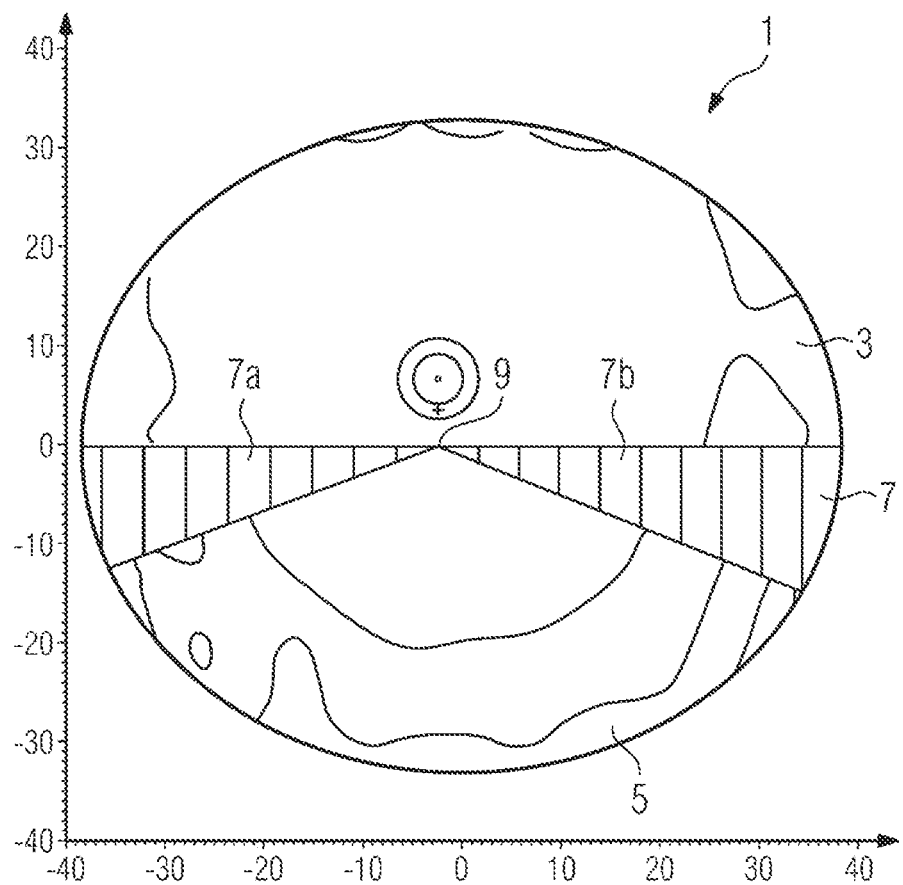
FIG. 2 shows a numerical representation of a first bifocal spectacle lens.
Figure 3:
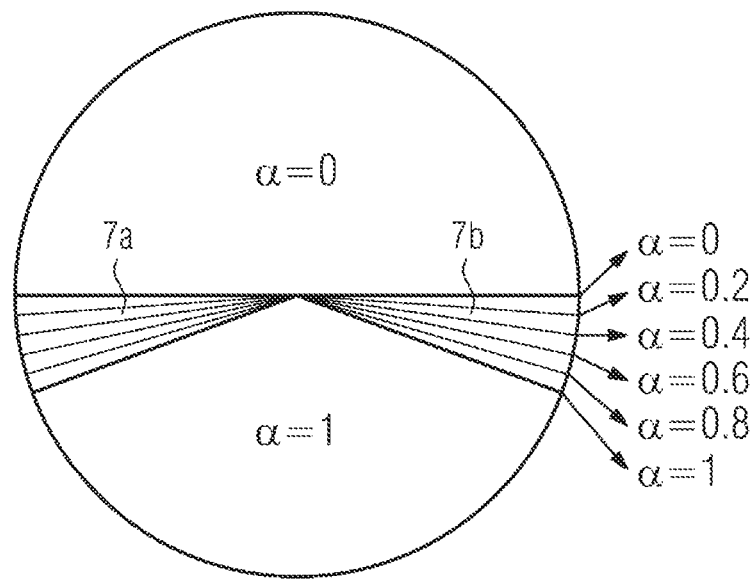
FIG. 3 shows a distribution of contour lines in a transition section of a numerical representation of a bifocal spectacle lens.
Figure 4:
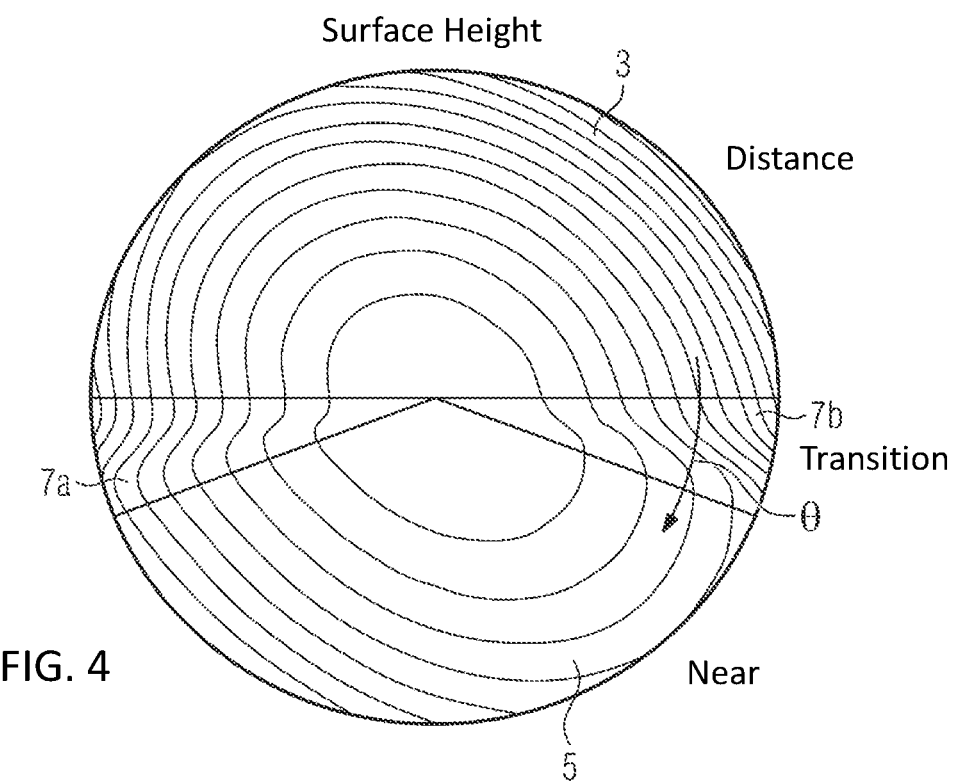
FIG. 4 shows an example for a surface height map of a numerical representation of a bifocal spectacle lens.

An exemplary embodiment for the computer implemented method for creating a numerical representation of a bifocal spectacle lens is explained below with reference to the flowchart illustrated in FIG. 1. Then, FIGS. 2 to 4 show examples of numerical representations of bifocal spectacle lenses, which can be produced by way of the method.

Prescription data for the distance portion and the near portion and the fixed or individualized working distance provided in each case are prescribed in the first step S1 of this exemplary embodiment. The prescription data contain the powers according to the prescription, i.e., the dioptric powers required for correcting a diagnosed refractive error, in the form of suitable values. In the case of spherical power, the prescription data may contain a value "sph" for sphere; the prescription data may contain a value "cyl" for cylinder and "axis" for axis in the case of astigmatic power. Moreover, there is the option of the prescription data containing values "PR" for prism and "B" for base in the case of prismatic power. In the present case, the prescription data also contain a value "add," which specifies the difference between the intended value for the prescription power for the spectacle wearer in the distance and the intended value for the prescription power for the spectacle wearer in the near region. Moreover, the prescription may also contain a value "PD" for the interpupillary distance.

Additionally, further data may optionally also be prescribed in addition to the prescription data, such as the conditions of use, for example, which contain the values of the "as worn" pantoscopic angle, of the face form angle and of the vertex distance, in particular, and/or frame data. Here, the conditions of use can be standardized conditions of use, i.e., conditions of use matched to a defined group of wearers without there being an individual match to a certain person, or individual conditions of use, which represent matching to a certain spectacle wearer. The frame data, too, can be standardized frame data that do not represent a certain frame.

Predetermining the prescription data and the optional conditions of use in step S1 can be implemented in different ways. By way of example, the data can be entered manually into a data processing system, in which the method is carried out, by way of a user interface, such as a keyboard or a touchscreen, for example. Additionally, there is the option of the data predetermined in step S1 being read into the data processing system from a storage medium or of the data predetermined in step S1 being received by the data processing system via a network. However, the manner in which the data are predetermined is unimportant within the scope of the present disclosure, and so any method allowing data to be predetermined can be used. In particular, the data processing system can be a computer on which software implementing the method is installed.

In the present exemplary embodiment, a numerical representation of a single vision spectacle lens for distance vision is optimized in a step S2 on the basis of the data predetermined in step S1. A target design for the numerical representation of the single vision spectacle lens for distance vision is predetermined within the scope of this optimization on the basis of the data predetermined in step S1, in particular on the basis of the "sph" value, optionally on the basis of "cyl," "axis," "PR" and "B" as well. This target design can be either an optical target design or a surface target design. Here, an optical target design is a distribution or a specification of image aberrations over the entire single vision spectacle lens or else, there beyond, in the spectacle wearer beam path. In particular, the image aberrations in this case can be a spherical residual deviation and an astigmatic residual deviation, wherein the spherical residual deviation specifies the maximum admissible deviation of the spherical power of the spectacle lens from the spherical power according to the prescription and the astigmatic residual deviation specifies the maximum admissible deviation of the astigmatic power of the spectacle lens from the astigmatic power according to the prescription. An optical target design specifies the distribution of the values to be obtained with a single vision spectacle lens for the admissible spherical residual aberrations and the admissible astigmatic residual aberrations in the so-called spectacle wearer beam path, i.e., in a beam path that passes through the pupil of the eye or the center of rotation of the eye. Typically, these residual aberrations in the form of individual values are defined on the basis of a multiplicity of points on the front surface of the spectacle lens (i.e., on the side of the spectacle lens facing away from the eye), the so-called optimization points. Within the scope of a ray calculation for calculating the distribution of the values for the spherical and the astigmatic residual aberration over the entire spectacle lens, use is made of beams of which respectively one ray, referred to as a chief ray below, extends not only through the spectacle lens but also through the center of rotation of the eye, with the chief rays passing through the front spectacle lens surface at the optimization points. Further distribution means of image aberrations may be predetermined in the target design in addition to the spherical residual deviation and the astigmatic residual deviation. Should conditions of use and/or frame data also be prescribed in step S1, these set the position and orientation of the spectacle lens in front of the eye within the scope of the ray calculation.

The optimization is implemented by virtue of prescribing a numerical representation for an initial single vision spectacle lens, the back face of which is described by parameterizable locally defined functions and the parameterization of the locally defined functions being modified. After each modification, the arising values for the obtained residual errors at the respective optimization points are calculated by means of the ray calculation and compared to the values prescribed by the optical target design. The ascertained differences are included in an error function, with the aid of which a value representing a measure for the global deviation of the obtained residual errors from the predetermined residual errors over the entire spectacle lens is calculated. As soon as this error function reaches a termination condition, the numerical representation of the single vision spectacle lens is optimized for the values predetermined in step S1. By way of example, the termination condition may contain reaching a minimum or dropping below a predetermined limit value by the value of the error function.

Even though an optical target design is used to optimize the single vision spectacle lens in the present exemplary embodiment, it is also possible to use a surface target design or a combination of an optical target design and a surface target design instead of the optical target design. Surface properties of the free-form surface represented by the locally defined functions are predetermined in a surface target design, for example a surface power and a surface astigmatism, which should be achieved at the respective optimization points. In the case of the surface target design, the optimization points lie on that surface defined by the locally defined functions. Here, the surface power is a measure for the ability of a surface section surrounding an optimization point to change the vergence (refractive index of the spectacle lens material divided by the radius of curvature of the wavefront) of a beam incident on the surface section from the air. The surface astigmatism at an optimization point represents the difference of the surface powers in the principal meridians at the optimization point. Here, the principal meridians at the optimization point are the meridian planes of the surface section surrounding the optimization point with maximum and minimal curvature, when the meridian planes are planes which contain the center of curvature of the surface section surrounding the optimization point and the normal vector of the surface section at the optimization point.

After the numerical representation of the single vision spectacle lens for distance vision has been optimized in step S2 in the present exemplary embodiment, an optimization of a numerical representation of a single vision spectacle lens for near vision is carried out in step S3 on the basis of the prescription data predetermined in step S1, in particular on the basis of the values "sph" and "add" and, optionally, additionally on the basis of "cyl," "axis," "PD," "PR" and "B". If conditions of use and/or frame data have been predetermined in step S1, the optimization is carried out also taking account of the conditions of use and/or frame data. Here, in particular, the numerical representation of the single vision spectacle lens can be optimized using the same methods as were described in relation to the optimization of the numerical representation of the single vision spectacle lens for distance vision.

Even though the numerical representation of the single vision spectacle lens for distance vision was optimized first, followed by the numerical representation of the single vision spectacle lens for near vision in the present exemplary embodiment, the sequence of the optimization can also be reversed as a matter of principle, and so the numerical representation of the single vision spectacle lens for near vision is optimized before the numerical representation of the single vision spectacle lens for distance vision is optimized. However, in principle, it is also possible for the numerical representation of the single vision spectacle lens for distance vision and the numerical representation of the single vision spectacle lens for near vision to be optimized simultaneously in parallel processes.

After both the numerical representation of the single vision spectacle lens for distance vision and the numerical representation of the single vision spectacle lens for near vision have been optimized, a transition section is determined in step S4 between the numerical representation of the optimized single vision spectacle lens for distance vision and the numerical representation of the optimized single vision spectacle lens for near vision. Here, the transition section represents a spectacle lens section whose front surface and back surface are determined in such a way that both the front surfaces and the back surfaces of the numerical representation of the optimized single vision spectacle lens for distance vision and the numerical representation of the optimized single vision spectacle lens for near vision are merged into one another in continuous fashion such that it is undetectable by an outside observer, is optically acceptable to the wearer, and can be produced by existing free-form technology. Since the transition section need not obtain any specific distribution of optical power, there is great freedom in the optimization of the transition section. If optimizing the single vision spectacle lenses contains an optimization of the spectacle lens back surface and if the front surfaces of the numerical representations of both single vision spectacle lenses have the same curvature, the transition section merely needs to create a continuous transition between the back surfaces of the numerical representations of the two optimized single vision spectacle lenses. Typically, the continuous transition is at least continuously differentiable such that there is no kink in one of the surfaces, either within the transition section or at the boundaries of the transition section. The transition section can be described by suitable functions.

Once the transition section has also been determined in step S4, the segment of the numerical representation of the optimized single vision spectacle lens for distance vision representing the distance portion of the numerical representation of the bifocal spectacle lens, the segment of the numerical representation of the optimized single vision spectacle lens for near vision forming the near portion of the numerical representation of the bifocal spectacle lens and the determined transition section are put together to form the numerical representation of the bifocal spectacle lens in step S5. The numerical representation of the bifocal spectacle lens created thus has a distance portion optimized in view of the power according to the prescription and, optionally, the conditions of use, a near portion optimized for the power according to the prescription and, optionally, the conditions of use, and a transition section optimized for a transition between the distance portion and the near portion that is smooth to a specified degree of continuity. Since the transition section need not obtain any specific distribution of optical power, there is great freedom in the optimization of the transition section.

In the present embodiment, the transition section is determined by a blending process. FIG. 2 shows an exemplary embodiment for a numerical representation of a bifocal spectacle lens, which was created according to the method described with reference to FIG. 1. The numerical representation of the bifocal spectacle lens 1 comprises, in the present exemplary embodiment, a semi-circular distance portion 3 for distance vision, a pie-shaped near portion 5 for near vision and a transition section 7 situated between the distance portion 3 and the near portion 5 which has been determined by a blending process, i.e. by determining a linear combination of the surfaces of the distance portion 3 and the near portion 5.

The optimization of the numerical representation of the spectacle lens for distance vision and the optimization of the numerical representation of the spectacle lens for near vision have been implemented under the boundary condition that the numerical representation of the respective single vision spectacle lens obtains the same spectacle lens thickness as in the case of the numerical representation of the other single vision spectacle lens for exactly one determined contact point 9. The transition section 7 includes two sectors 7a, 7b which are connected to each other at the contact point 9. By way of example, the contact point 9 may lie on the line along which the direction of view moves in the case of a change from distance vision to near vision. As a result, irritations when changing from distance vision to near vision can be minimized by the optically continuous transition zone. Proceeding from the contact point 9, which lies in a central region of the numerical representation of the bifocal spectacle lens, the width of the transition section sectors 7a, 7b increases towards the edge of the numerical representation of the bifocal spectacle lens 1. The same spectacle lens thickness can be obtained both in the near portion 5 and in the distance portion 3 for exactly one point, but the differences in the heights of the surfaces increase toward the edge of the numerical representation of the bifocal spectacle lens and become ever greater on account of the deviating surface curvatures of the two portions 3, 5. So as not to let the gradient in the transition section become too large, the width of the transition section sectors 7a, 7b increases towards the edge in order to compensate the increasing differences in the heights of the surfaces.

In the following, determining the transition section 7, in particular the surface of the surface of the transition section 7, by a blending process is described. A polar coordinate system with its origin in the contact point 9 is superimposed on the transition section 7. In particular any point in the transition section 7 has an associated angle θ which ranges between 0 and $\theta_{max}$. If we let $\alpha=\theta/\theta_{max}$ then a ranges between 0 and 1. Defining α=0 over the distance zone and α=1 over the near zone gives the distribution mapped in FIG. 3. The contours at 0.2 for a will be standard for the subsequent maps of α distributions, but the labelling will not be repeated. A suitably smooth blending function $f(\alpha)$ would have $f(0)=0$, $f(1)=1$, and some number of derivatives equal to zero at both ends. If the surface height of the distance portion 3 is given by Dist(r, θ), and the surface height of the near portion 5 is given by Near(r, θ), then the general form for height the blended surface of the transition section 7 Blend(r, θ) is given by the following linear combination:

Blend(r,θ)=(1−$f$(α(r,θ)))Dist(r,θ)+$f$+(α(r,θ))Near(r,θ).

A surface to be cut by a freeform generator should at least have continuous curvature, and should be continuous though the second derivative. The boundary conditions for the function $f(\alpha)$ would then be (the primes indicate differentiation with respect to a):

$f(0)=0, f(1)=1, f'(0)=0, f'(1)=0, f''(0)=0, f''(1)=0$.

The following fifth order function can satisfy this set of constraints;

$f(\alpha)=10\alpha^3-15\alpha^4+6\alpha^5$.

FIG. 4 shows an example for a surface height map of a numerical representation of a bifocal spectacle lens 1 having blended transition section 7. The numerical representation of the bifocal spectacle lens 1 has in its distance portion 3 a toroidal surface with a sphere value of 6 dioptres, a cylinder value of −2 dioptres and an axis value of 45 degree, and in its near portion 5 a toroidal surface with a sphere value of 4 dioptres, a cylinder value of −2 dioptres and an axis value of 45 degree. The angle θ of the transition section 7 is 20 degree. The contours represent heights differences of 0.5 mm.

Figure 5:
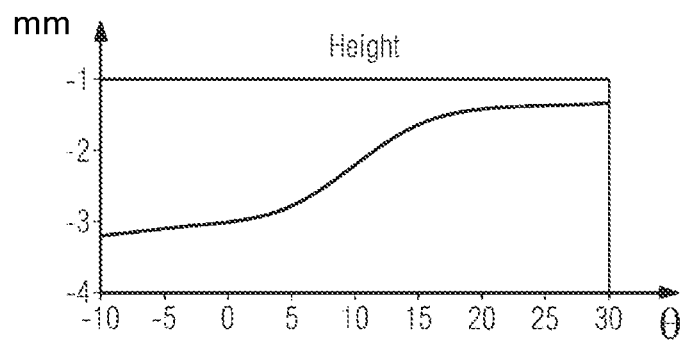
FIG. 5 shows the surface height of the numerical representation of bifocal spectacle lens along an angular path.
Figure 6:
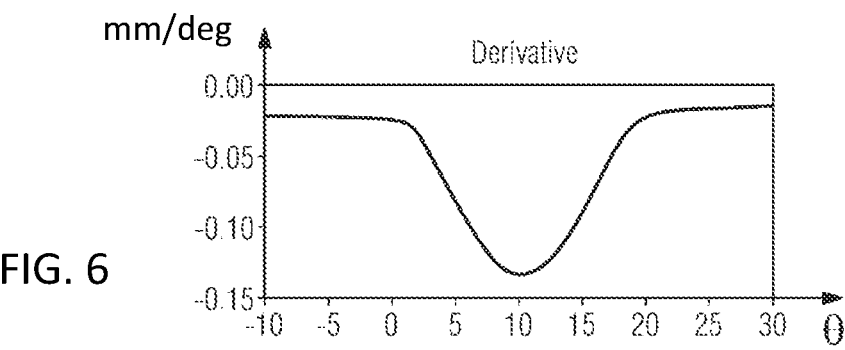
FIG. 6 shows the angular first derivative of the surface height shown in FIG. 5.
Figure 7:
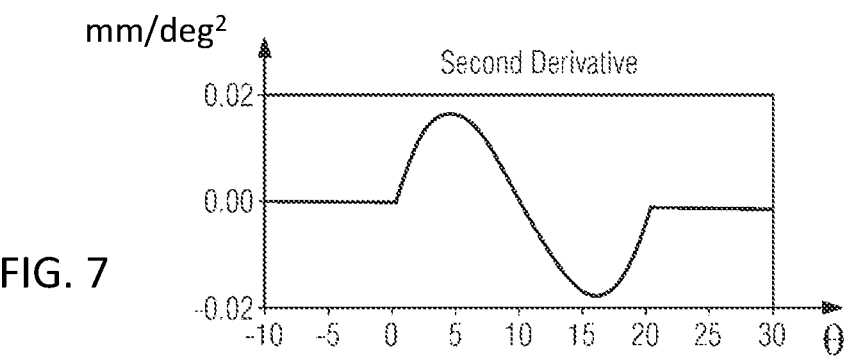
FIG. 7 shows the angular second derivatives of the surface height shown in FIG. 5.

FIGS. 5 to 7 show the surface height of the numerical representation of bifocal spectacle lens along the angular path shown in FIG. 4 by an arrow (FIG. 5), the angular first and second derivatives of the height along the same path (FIGS. 6 and 7, respectively). Notice that the second derivative is continuous, as desired. The cutting path in a freeform generator is a tight spiral pattern, so a surface which is continuous through second derivative angularly should also be continuous through second derivative for the cutting tool. If a higher degree of smoothness is desired then the process can be extended to include zero third derivatives at each end. A polynomial which will accomplishes this is:

$f(\alpha)=35\alpha^4-84\alpha^5+70\alpha^6-20\alpha^7$.

While, in the foregoing the blended transition section 7 was delimited against the distance portion 3 and the near portion 5 by straight lines resembling constant angles independent of the radial position along the surface of the transition section 7, so that the transition section 7 resembles two pie slices touching each other at their apexes, more complex shapes of the boundaries between the blended transition section 7 on one hand and the distance portion 3 and the near portion 5 on the other hand are also possible.

Boundaries of the blended transition section 7 to the distance portion 3 and to the near portion 5 can be represented as functions of the radial distance from the center of the numerical representation of a bifocal spectacle lens 1 where the center represents the intersection point of distance portion 3 and near portion. 5. These functions are called boundary functions in the following. With such boundary functions, the same linear combination equation for blending as has been used before can also be used by simply making the parameter α a function of radius. Specifically if the boundary to the distance portion 3 is described by the boundary function $\theta_D(r)$ and the boundary to the near portion 5 by the boundary function $\theta_N(r)$ then the parameter function α(r, θ) between the boundaries can be defined as α(r,θ)=(θ−$\theta_D(r)$)/($\theta_N(r)$−$\theta_D(r)$).

Figure 8:
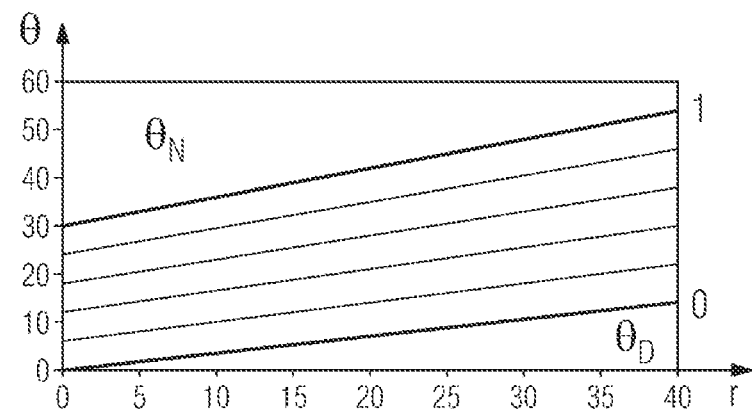
FIG. 8 shows a graph of boundary functions.
Figure 9:
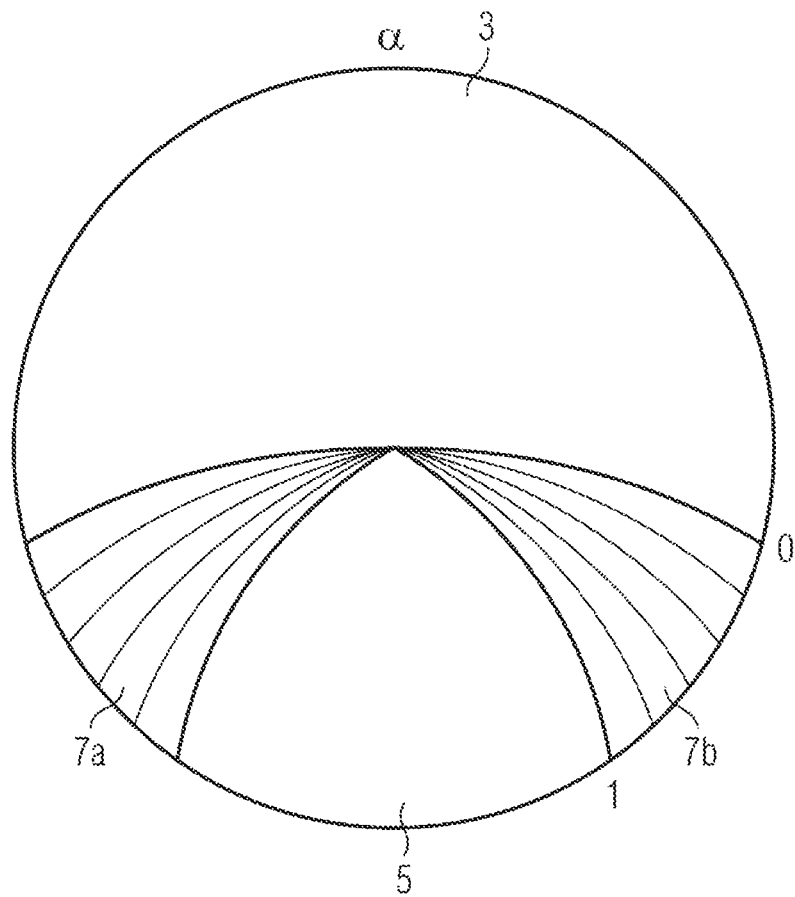
FIG. 9 shows a distribution of contour lines in a transition section of a numerical representation of a bifocal spectacle lens.

FIG. 8 shows, for an exemplary embodiment, a graph of the boundary functions $\theta_D$ and $\theta_N$ for the distance portion 3 and for the near portion 5 which are simple linear functions of r. The graphs represent the boundary for the right hand side of a surface, with θ measured clockwise from horizontal. FIG. 9 is a contour plot of the resulting distribution α(r, θ). In the depicted exemplary embodiment, the boundary of the transition section to the distance portion 3 starts out horizontal with $\theta_D(0)=0$ and smoothly bends by 15 degrees at the r=40 mm edge. The boundary to the near portion 5 starts with a 30 degree slope. The 55 degree end of the boundary to the near portion 5 causes the angular width of the blended transition section 7 to increase from 30 to 40 degrees from the center to the edge of the numerical representation of a bifocal spectacle lens 1.

Figure 10:
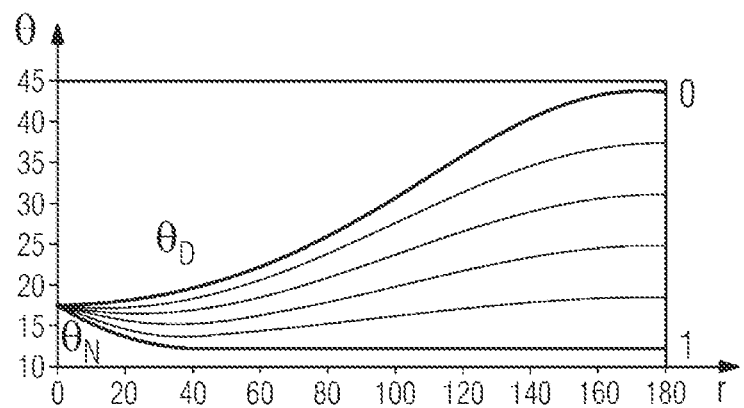
FIG. 10 shows a graph of boundary functions.
Figure 11:
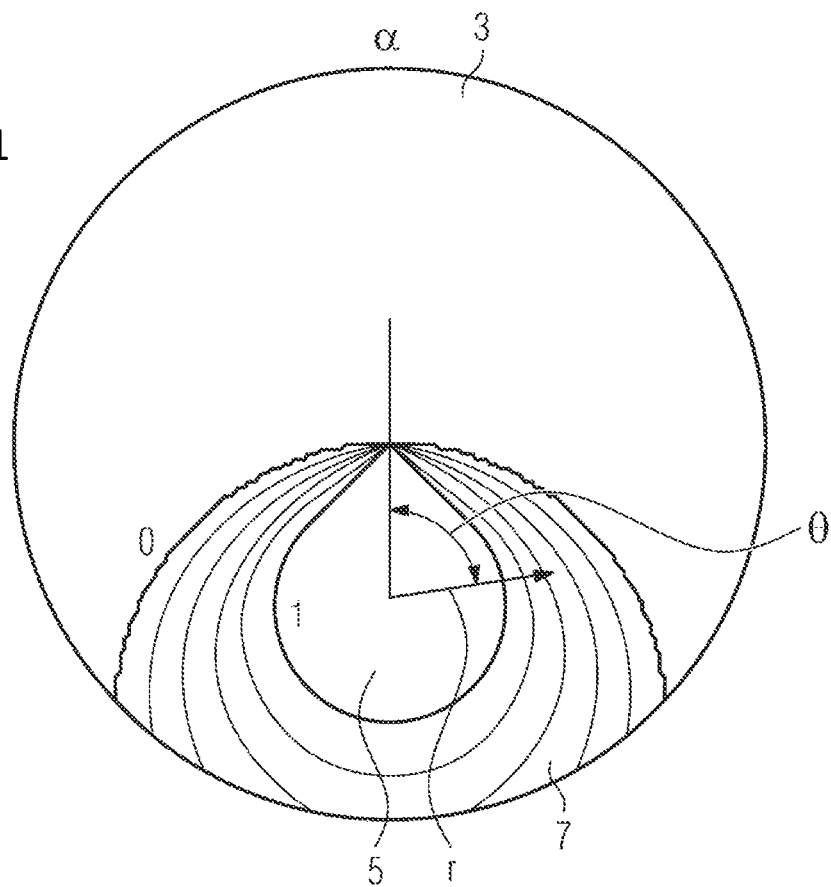
FIG. 11 shows a distribution of contour lines in a transition section of a numerical representation of a bifocal spectacle lens.

Polar coordinates centered at the center of the numerical representation of a bifocal spectacle lens 1 are not practical or appropriate for some boundary shapes. One example is the modified round near portion 5 shown in FIGS. 10 and 11, where FIG. 10 shows a graph of the distance and near boundary functions $\theta_D$ and $\theta_N$ and FIG. 11 shows a contour plot of the resulting distribution α(r, θ). The modification of the example shown in FIGS. 10 and 11 lies in the pointed section of the near portion 5 with the apex of the pointed section showing towards the distance portion 3. This modification allows the distance portion 3 and near portion 5 to meet at the center of the design, and also provides a wide angular separation of the contours near the point of intersection between the distance portion 3 and the near portion 5. The full distribution α can be calculated by linear interpolation of the boundary function as described in the previous section, in the translated coordinate system. With polar coordinates centered at the center of the numerical representation of the bifocal spectacle lens 1 the boundary to the near portion 5 disappears past a finite radius. An alternative is to move the center of the polar coordinate system to the interior of the near portion 5.

Figure 12:
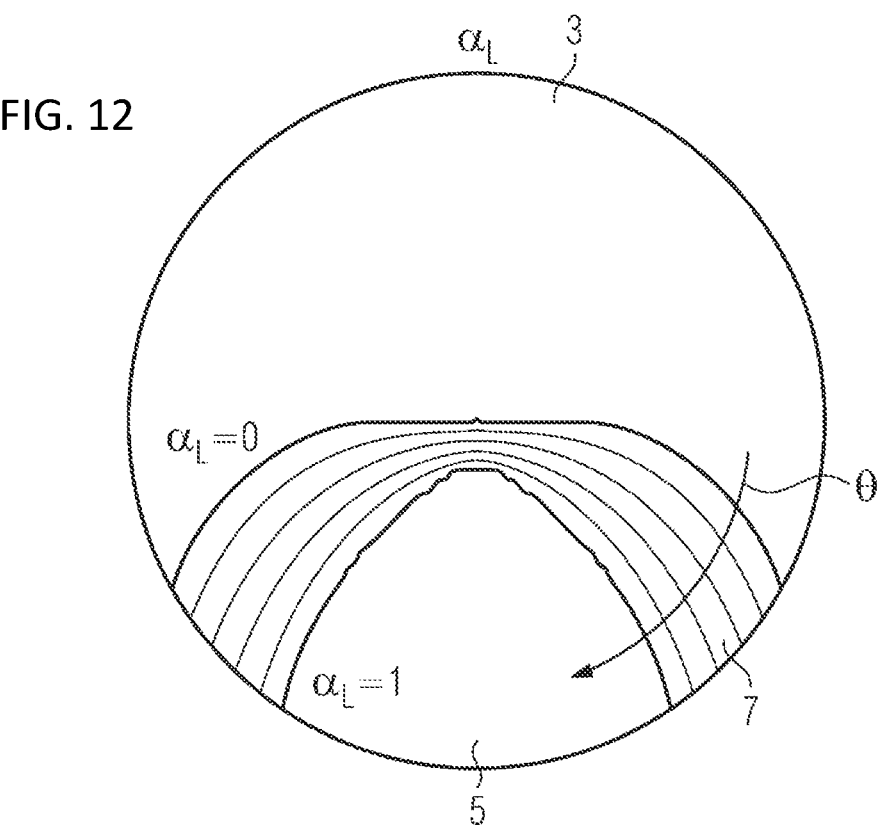
FIG. 12 shows a distribution of contour lines in a transition section of a numerical representation of a bifocal spectacle lens.

For some boundary function shapes there may be no obvious natural coordinate system for generating the blended surface of the transition section 7. For such a case a reasonable estimate of an α distribution can be derived by solving Laplace's equation in the transition zone using the boundaries to the distance portion 3 and near portion 5 for Dirichlet boundary conditions. Solutions to Laplace's equation have the property that the value at any location is equal to the average value of the surrounding area. This property both guarantees a smooth transition section and provides a simple iterative method for estimating the a distribution. FIG. 12 shows $\alpha_L$, the solution to Laplace's equation given the shown boundaries to the distance portion 3 and the near portion 5. The contours drawn in the transition section 7 show that the spacing between contour lines is slightly larger close to the boundary to the distance portion 3, and smaller close to the boundary to the near portion 5.

Although examples of blended transition sections have been described above, optimized transition sections 7 are also possible. For the purposes of optimizing the transition section, segments of the numerical representation of the optimized single vision spectacle lens for distance vision and of the numerical representation of the optimized single vision spectacle lens for near vision may be chosen in the present exemplary embodiment, the segments being intended to form the distance portion 3 and near portion 5 of the numerical representation of the bifocal spectacle lens 1. Typically, the size and the form of the segment representing the distance portion 3 is predetermined in the process. Size and form of the segment forming the near portion 5 can be varied within the scope of optimizing the transition section. However, in principle, it is also possible to vary the size and the form of both the near portion 5 and the distance portion 3 within the scope of the optimization.

The transition section may, for example, be optimized in view of an optical property in the transition section 7, e.g. in view of a distribution of astigmatism in the transition section 7. A global value for the deviation of the actual distribution of astigmatism of the transition section 7 from a distribution of astigmatism specified for the transition section 7 can be ascertained by means of an error function. The optimization of the transition section 7 is completed if this error function satisfies a termination criterion. In the present example, the termination criterion is when the error function does not exceed a given limit. In the present exemplary embodiment, a segment for the near portion 5 is predetermined and an optimization of the surface or the surfaces of the transition section 7 is subsequently undertaken. This completes the optimization provided the termination criterion of the error function can be achieved. If the termination criterion of the error function cannot be achieved with the predetermined segment for the near portion, the form of the near portion is varied such that a different form of the transition section is obtained. If the optimization using the new modification of the near portion achieves the termination criterion then the process is complete. If the termination criterion is not achieved then the near portion is further varied. This sequence is continued until the termination criterion is satisfied.

Like the surfaces to be optimized in the numerical representations of the single vision spectacle lenses, the surface to be optimized in the transition section can also be represented by parameterized locally defined functions.

Further exemplary embodiments for numerical representations of bifocal spectacle lenses, which are producible according to the method described above, are illustrated in FIGS. 13 and 14.

Figure 13:
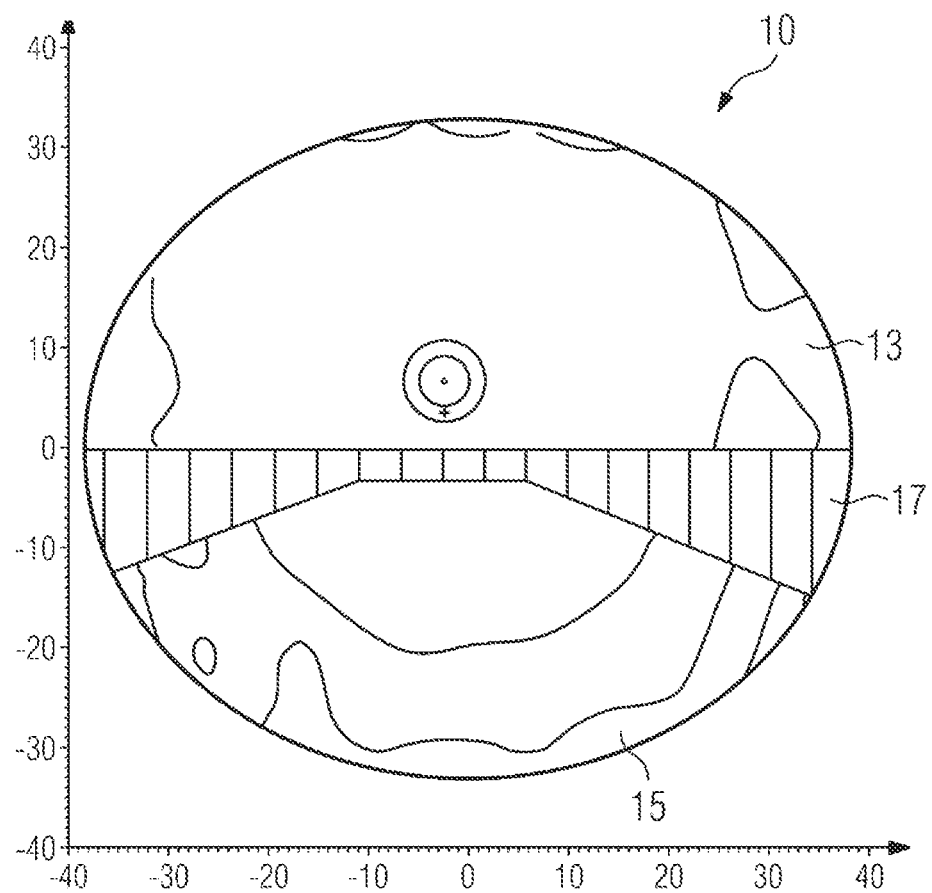
FIG. 13 shows a numerical representation of a second bifocal spectacle lens.

The numerical representation of the bifocal spectacle lens 10 shown in FIG. 13 has a distance portion 13 and a near portion 15, which are segments of the same numerical representations of optimized single vision spectacle lenses like the distance portion 3 and the near portion 5 of the numerical representation of the bifocal spectacle lens 1 shown in FIG. 2. Consequently, the numerical representation of the bifocal spectacle lens 10 shown in FIG. 13 differs from the numerical representation of the bifocal spectacle lens 1 shown in FIG. 2 merely in the transition section 17. The latter is configured in such a way that the distance portion 13 and the near portion 15 do not adjoin one another but only adjoin the transition section 17. As a result, the near portion 15 of the bifocal spectacle lens 10 shown in FIG. 13 is slightly smaller in comparison with the near portion 5 of the bifocal spectacle lens 1 shown in FIG. 2; in exchange, the configuration of the transition section 17 shown in FIG. 13 is suitable to bind near portions 15 to the distance portion 13 with a sufficiently small gradient in the transition section 17 if the near portions have a high addition, which cannot always be produced in such a way that they have the same thickness as the distance portion 13 at a point without the distance portion 13 becoming excessively thick as a result thereof.

Figure 14:
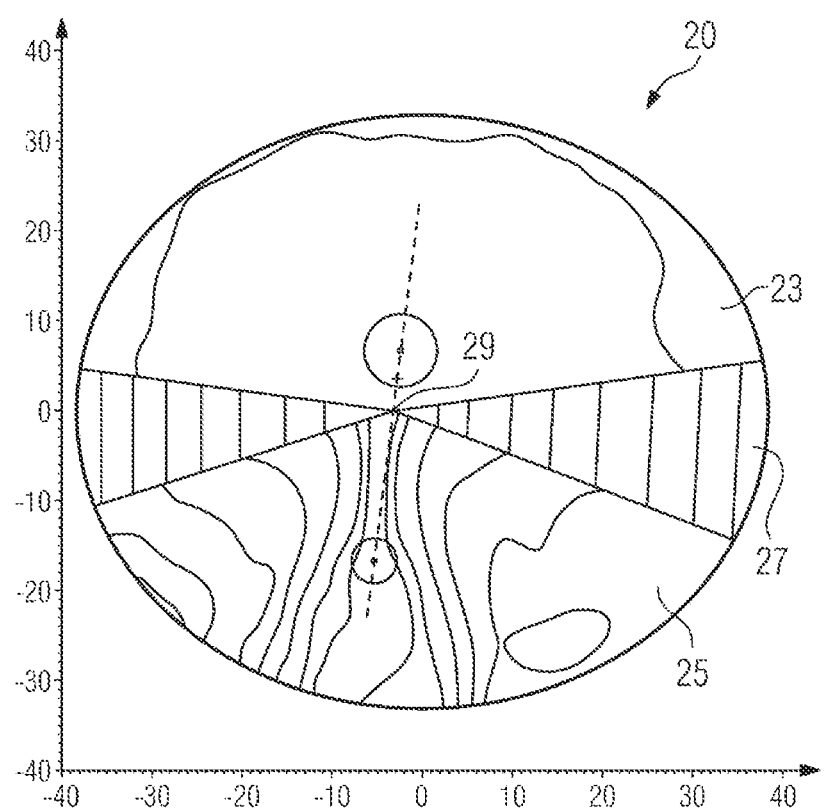
FIG. 14 shows a numerical representation of a third bifocal spectacle lens.

In the numerical representation of a bifocal spectacle lens 20 shown in FIG. 14, which was also created according to the method described above, the distance portion 23 corresponds to the distance portion 3 of the numerical representation of bifocal spectacle lenses 1 illustrated in FIG. 2 except for the shape of its boundary to the transition section 27. In addition, the type of near portion 25 of the numerical representation of the bifocal spectacle lens 20 illustrated in FIG. 14 differs from the kind of near portion 5 of the numerical representation of bifocal spectacle lenses 1 illustrated in FIG. 2.

In the present numerical representation of a bifocal spectacle lens 20, the near portion 25 is embodied as a segment of a near comfort spectacle lens. A near comfort spectacle lens is embodied for focused vision in a near region that typically extends from 30 to 100 cm. In its upper region, the near comfort spectacle lens is embodied for vision at a distance of 100 cm. By contrast, in its lower region, which is embodied as a near region, it is embodied for vision at a distance of 30 cm. To this end, the near region has an addition in relation to the region embodied for vision at a distance of 100 cm. Between the region embodied for vision at 100 cm and the near region, there is a corridor in which the addition increases up to the near region to the value according to the prescription. Within this meaning, the near comfort spectacle lens should be considered to be a progressive addition lens and can be produced using the same techniques as progressive addition lenses.

The numerical representation of a bifocal spectacle lens 20 illustrated in FIG. 14 can be produced by the method described with respect to FIG. 1 if, in step S4, a numerical representation of a progressive addition spectacle lens is optimized instead of the numerical representation of a single vision spectacle lens for near vision. This is possible, in particular, if the prescription data specify a value for the addition. Moreover, at least general conditions of use and, typically, individual conditions of use must also predetermined in order to be able to carry out the optimization of the numerical representation of the progressive addition spectacle lens. A near comfort spectacle lens is optimized as a progressive addition spectacle lens in the present exemplary embodiment. To this end, an addition for the near comfort spectacle lens, information about the length of the corridor, etc., will also be predetermined in step S1 in addition to the prescription values for near vision, for example for vision at a distance of 38 cm. Moreover, at least general conditions of use and, typically, individual conditions of use are also be predetermined for the near comfort spectacle lens in order to be able to carry out the optimization of the numerical representation of the near comfort spectacle lens.

If the representation of the bifocal spectacle lens 20 illustrated in FIG. 14 is formed by putting together the sectors of the numerical representation of the optimized single vision spectacle lens for distance vision, the numerical representation of the optimized near comfort spectacle lens and the optimized transition section in step S5 from FIG. 1, it may be the case that it is not the entire near region covered by the numerical representation of the optimized near comfort spectacle lens (or optionally of another optimized progressive addition spectacle lens) that is adopted in the numerical representation of the bifocal spectacle lens; however, the near region nevertheless can still be extended in comparison with the use of a segment of the numerical representation of an optimized single vision spectacle lens for near vision, for example to near region distances from 38 cm to 60 cm or even to 80 cm.

Figure 15:
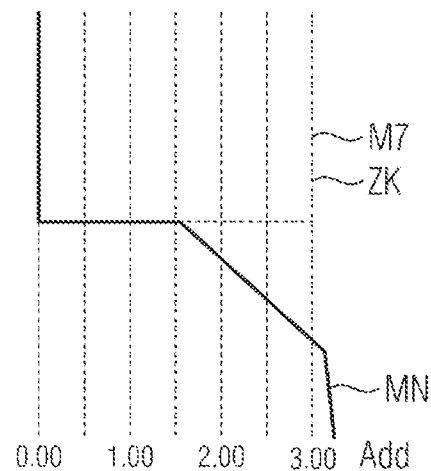
FIG. 15 illustrates the curve of the addition along the dashed line plotted in FIG. 14.

A bifocal spectacle lens as provided by the numerical representation in FIG. 14 offers the advantage over a conventional progressive addition lens that a lower effective addition is necessary; this facilitates a wider corridor which, in turn, increases the comfort in the extended near region. FIG. 15 illustrates the curve of the addition of the bifocal spectacle lens 20 along the dashed line plotted in FIG. 14. It is possible to identify that the addition has a value of 0 dioptres in the distance portion and the addition jumps to the value of 1.50 dioptres at the point 29, at which the distance portion 23 and the near portion 25 are in contact. Then, in an intermediate region, it increases from 1.5 dioptres to a value of approximately 3 dioptres, at which it then remains.

Moreover, the transition section 27 in FIG. 14 differs from the transition section 7 illustrated in FIG. 1 in that the upper boundary of the transition section 27 does not extend along a horizontal line but, proceeding from point 29, at which the distance portion 23 and the near portion 25 are in contact, extends radially outward and simultaneously upward in FIG. 14. Although this slightly reduces the distance portion 23, the boundary between the transition section 27 and the near portion 25 can be slightly tilted upward in exchange, and so a larger near portion 25 is possible in comparison with a horizontal line between the transition section and the distance portion, as present in FIG. 2. As a result of enlarging the near portion, the advantages of the near portion based on a near comfort spectacle lens can be better exploited.

The disclosure described on the basis of exemplary embodiments facilitates the production of bifocal spectacle lenses by means of free-form technology, as a result of which the imaging quality of the bifocal spectacle lenses can be improved. Moreover, an improvement of the imaging quality by an asphere for the distance portion can be implemented in analogous fashion to conventional aspheric single vision spectacle lenses with an aspherization according to base curves. A further improvement in the optical properties can be realized by adding an aspherization of the near portion according to base curves. An even further improvement in the optical properties can be achieved if conditions of use, be these general conditions of use or individual conditions of use, are taken into account during the aspherization. The optimal optical properties can be obtained if individual conditions of use are considered in addition to individual prescription data, both for the distance portion and for the near portion. An even further improvement can be realized by taking account of individual wavefront measurements of the eye when optimizing the distance portion and the near portion. If the near portion is embodied in the form of a segment of a near comfort spectacle lens, it moreover becomes possible to provide a bifocal spectacle lens that facilitates sharp vision not only for two defined working distances, but over a defined near region.

The present disclosure has been described in detail on the basis of exemplary embodiments for purposes of explanation. However, a person skilled in the art recognizes that there may be deviations from the exemplary embodiments within the scope of the present disclosure. Thus, for instance, the boundaries between the distance portion and the transition section and between the near portion and the transition section need not necessarily extend long horizontal lines; instead, they could just as easily extend along curved lines, as shown in FIG. 9, or even along irregular lines. Furthermore, the near portion can be embodied as a circular section of the numerical representation of the bifocal spectacle lens, which is surrounded by a ring-shaped transition section. Moreover, the optimized surfaces of the numerical representation of the single vision spectacle lenses, of the numerical representation of the near comfort spectacle lens and of the transition section form the back surfaces of the respective spectacle lenses or of the section in the described exemplary embodiments. However, in principle it is also possible to optimize the front surfaces instead of the back surfaces. Furthermore, particularly in the transition section, there is the option of optimizing both the front surface and the back surface, particularly if the numerical representation of the optimized spectacle lens for distance vision on the one hand and the numerical representation of the optimized spectacle lens or of the optimized near comfort spectacle lens on the other hand have front surfaces with different radii of curvature. Therefore, the present disclosure is intended to be restricted only by the appended claims.

The disclosure may be described by the following clauses

Clause 1: A computer implemented method for creating a numerical representation of a bifocal spectacle lens (1, 10, 20) with a distance portion (3, 13, 23), a near portion (5, 15, 25) and a transition section (7, 17, 27) situated between the distance portion (3, 13, 23) and the near portion (5, 15, 25), wherein the distance portion (3, 13, 23) is optimized in view of optical power for distance vision and the near portion (5, 15, 25) is optimized in view of optical power for near vision and the transition section (7, 17, 27) is determined in such a way that the latter creates a continuous transition between the distance portion (3, 13, 23) and the near portion (5, 15, 25), wherein the distance portion (3, 13, 23) and the near portion (5, 15, 25) are optimized independently of one another and subsequently put together with the transition section (7, 17, 27) to form the numerical representation of the bifocal spectacle lens (1, 10, 20).

Clause 2: The computer implemented method as described in clause 1, wherein the transition section (7, 17, 27) is adapted to the distance portion (3, 13, 23) and the near portion (5, 15, 25) in such a way that an at least continuously differentiable transition is created between the transition section (7, 17, 27) and the distance portion (3, 13, 23) and between the transition section (7, 17, 27) and the near portion (5, 15, 25).

Clause 3: The computer implemented method as described in clause 1 or clause 2, wherein for the purposes of optimizing the distance portion (3, 13, 23) and the near portion (5, 15, 25), a numerical representation of a spectacle lens for distance vision and a numerical representation of a spectacle lens for near vision are optimized and the numerical representation of the bifocal spectacle lens (1, 10, 20) is created by virtue of being put together from a segment of the optimized numerical representation of the spectacle lens for distance vision, a segment of the optimized numerical representation of the spectacle lens for near vision and the transition section (7, 17, 27).

Clause 4: The computer implemented method as described in clause 3, wherein a numerical representation of a single vision spectacle lens finds use as a numerical representation of the spectacle lens for distance vision.

Clause 5: The computer implemented method as described in clause 3, wherein a numerical representation of a single vision spectacle lens finds use as a numerical representation of the spectacle lens for distance vision.

Clause 6: The computer implemented method as described in clause 3 or clause 4, wherein a numerical representation of a single vision spectacle lens or a near vision comfort spectacle lens finds use as the numerical representation of the spectacle lens for near vision.

Clause 7: The computer implemented method as described in any one of clauses 1 to 5, wherein the distance portion (3, 23), the near portion (5, 25) and the transition section (7, 27) are put together in such a way that the distance portion (3, 23) and the near portion (5, 25) touch at exactly one contact point (9, 29), wherein the optimization of the distance portion (3, 23) and of the near portion (5, 25) is carried out under the boundary condition that they have the same thickness at the contact point (9, 29).

Clause 8: The computer implemented method as described in any one of clauses 1 to 5, wherein the distance portion (13), the near portion (15) and the transition section (17) are put together in such a way that the distance portion (13) and the near portion (15) in each case only adjoin the transition section (17).

Clause 9: The computer implemented method as described in any one of clauses 1 to 7, wherein use is made of a transition section (7, 17, 27) that, proceeding from a central section of the numerical representation of the bifocal spectacle lens (1, 10, 20), becomes wider toward the edge of the numerical representation of the bifocal spectacle lens (1, 10, 20).

Clause 10: The computer implemented method as described in any one of clauses 1 to 8, wherein the transition section (7, 17, 27) is determined by providing an overlap region between the distance portion (3, 13, 23) and the near portion (5, 15, 25) where a surface of the overlap region is a linear combination of a surface of the distance portion (3, 13, 23) and a surface of the near portion (5, 15, 25) in the overlap region.

Clause 10: The computer implemented method as described in clause 9, wherein the linear combination in the overlap region is given at any point of the transition section by a sum of the height of the surface of the distance portion (3, 13, 23) at a point in the transition section multiplied by first coefficient and the height of the surface of the near portion (5, 15, 25) at this point multiplied by a second coefficient where the sum of the first coefficient and the second coefficient equals one at every point in the transition section (7, 17, 27).

Clause 11: A computer program for creating a numerical representation of a bifocal spectacle lens (1, 10, 20) with a distance portion (3, 13, 23), a near portion (5, 15, 25) and a transition section (7, 17, 27) situated between the distance portion (3, 13, 23) and the near portion (5, 15, 25), comprising instructions that, when executed on a computer, prompt the computer to optimize the distance portion (3, 13, 23) in view of optical power for distance vision and the near portion (5, 15, 25) in view of optical power for near vision and determine or optimize the transition section (7, 17, 27) in such a way that the latter creates a continuous transition between the distance portion (3, 13, 23) and the near portion (5, 15, 25), wherein the instructions, when executed on the computer, prompt the computer to optimize the distance portion (3, 13, 23) and the near portion (5, 15, 25) independently of one another and subsequently put these together with the transition section (7, 17, 27) to form the numerical representation of the bifocal spectacle lens (1, 10, 20).

Clause 12: A data processing system for creating a numerical representation of a bifocal spectacle lens (1, 10, 20) with a distance portion (3, 13, 23), a near portion (5, 15, 25) and a transition section (7, 17, 27) situated between the distance portion (3, 13, 23) and the near portion (5, 15, 25), wherein the data processing system comprises a processor and at least one memory and the processor is configured, on the basis of instructions of a computer program stored in the memory, to optimize the distance portion (3, 13, 23) in view of optical power for distance vision and the near portion (5, 15, 25) in view of optical power for near vision and to determine or optimize the transition section (7, 17, 27) in such a way that the latter creates a continuous transition between the distance portion (3, 13, 23) and the near portion (5, 15, 25), wherein the processor is moreover configured, on the basis of the instructions of the computer program stored in the memory, to optimize the distance portion (3, 13, 23) and the near portion (5, 15, 25) independently of one another and subsequently put these together with the transition section (7, 17, 27) to form the numerical representation of the bifocal spectacle lens (1, 10, 20).

Clause 13: A non-volatile computer readable storage medium with instructions stored thereon for creating a numerical representation of a bifocal spectacle lens (1, 10, 20) with a distance portion (3, 13, 23), a near portion (5, 15, 25) and a transition section (7, 17, 27) situated between the distance portion (3, 13, 23) and the near portion (5, 15, 25), wherein the instructions, when executed on a computer, prompt the computer to optimize the distance portion (3, 13, 23) in view of optical power for distance vision and the near portion (5, 15, 25) in view of optical power for near vision and determine or optimize the transition section (7, 17, 27) in such a way that the latter creates a continuous transition between the distance portion (3, 13, 23) and the near portion (5, 15, 25), wherein the storage medium moreover comprises instructions stored thereon, which instructions, when executed on the computer, prompt the computer to optimize the distance portion (3, 13, 23) and the near portion (5, 15, 25) independently of one another and subsequently put these together with the transition section (7, 17, 27) to form the numerical representation of the bifocal spectacle lens (1, 10, 20).

Clause 14: A bifocal spectacle lens (1, 10, 20) with a distance portion (3, 13, 23), a near portion (5, 15, 25) and a transition section (7, 17, 27) situated between the distance portion (3, 13, 23) and the near portion (5, 15, 25), the transition section creating a continuous transition between the distance portion (3, 13, 23) and the near portion (5, 15, 25), wherein the distance portion (3, 13, 23) and the near portion (5, 15, 25) represent portions of spectacle lenses that were optimized independently of one another.

Clause 15: The bifocal spectacle lens (1, 20) as described in clause 14, wherein the near portion (3, 23) and the distance portion (5, 25) touch at exactly one point (9, 29) of the bifocal spectacle lens (1, 20).

Clause 16: The bifocal spectacle lens (20) as described in clause 14 or clause 15, wherein the near portion (27) represents a portion of the near vision comfort spectacle lens.

Clause 17: The bifocal spectacle lens (20) as described in any one of clauses 14 to 16, wherein the transition section (7, 17, 27) is an overlap region between the distance portion (3, 13, 23) and the near portion (5, 15, 25) which overlap region comprises a surface which is a linear combination of the surface of the distance portion (3, 13, 23) and the surface of the near portion (5, 15, 25) in the overlap region.

Clause 18: The bifocal spectacle lens (1, 20) as described in clause 17, wherein the linear combination is given at any point of the transition section by a sum of the height of the surface of the distance portion (3, 13, 23) at a point in the transition section multiplied by first coefficient and the individual height of the surface of the near portion (5, 15, 25) at this point multiplied by a second coefficient where the sum of the first coefficient and the second coefficient equals one at every point in the transition section (7, 17, 27).

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

1 Numerical representation of the bifocal spectacle lens
3 Distance portion
5 Near portion
7 Transition section
9 Contact point
10 Numerical representation of a bifocal spectacle lens
13 Distance portion
15 Near portion
17 Transition section
20 Numerical representation of a bifocal spectacle lens
23 Distance portion
25 Near portion
27 Transition section
29 Contact point
S1 Predetermining prescription data and, optionally, conditions of use
S2 Optimizing a numerical representation of a spectacle lens for distance vision
S3 Optimizing a numerical representation of a spectacle lens for near vision
S4 Optimizing the transition section
S5 Putting together the numerical representation of the bifocal spectacle lens

The invention claimed is:

1. A method for creating a numerical representation of a bifocal spectacle lens having a distance portion, a near portion, and a transition section situated between the distance portion and the near portion, the method comprising:
optimizing the distance portion;
optimizing the near portion in view of an optical power for near vision;
determining or optimizing the transition section by creating a continuous transition between the distance portion and the near portion, wherein the transition section is determined or optimized after the distance portion and the near portion have been optimized; and
subsequently putting the distance portion and the near portion together with the transition section to form the numerical representation of the bifocal spectacle lens,
wherein the method is computer implemented,
wherein the distance portion is optimized in view of an optical power for distance vision,
wherein the distance portion and the near portion are optimized independently of one another,
wherein, for the purposes of optimizing the distance portion and the near portion, a numerical representation of a spectacle lens for distance vision and a numerical representation of a spectacle lens for near vision are optimized, and
wherein the numerical representation of the bifocal spectacle lens is created by virtue of being put together from a segment of the optimized numerical representation of the spectacle lens for distance vision, a segment of the optimized numerical representation of the spectacle lens for near vision, and the transition section.

2. The computer implemented method as claimed in claim 1, further comprising:
adapting the transition section to the distance portion and the near portion such a that an at least continuously differentiable transition is created between the transition section and the distance portion and between the transition section and the near portion.

3. The computer implemented method as claimed in claim 1, wherein
a numerical representation of a single vision spectacle lens finds use as a numerical representation of the spectacle lens for distance vision, and/or
a numerical representation of a single vision spectacle lens or a near vision comfort spectacle lens finds use as the numerical representation of the spectacle lens for near vision.

4. The computer implemented method as claimed in claim 1, further comprising:
putting together the distance portion, the near portion, and the transition section such that:
the distance portion and the near portion touch at exactly one contact point, wherein the optimization of the distance portion and of the near portion is carried out under the boundary condition that the distance portion and the near portion have the same thickness at the contact point, or
the distance portion, the near portion, and the transition section are put together such that the distance portion and the near portion in each case only adjoin the transition section.

5. The computer implemented method as claimed in claim 1, wherein the transition section, proceeding from a central section of the numerical representation of the bifocal spectacle lens, becomes wider toward an edge of the numerical representation of the bifocal spectacle lens.

6. The computer implemented method as claimed in claim 1, further comprising:
determining the transition section by providing an overlap region between the distance portion and the near portion, wherein a surface of the overlap region is a linear combination of a surface of the distance portion and a surface of the near portion in the overlap region.

7. The computer implemented method as claimed in claim 6, wherein the linear combination in the overlap region is given at any point of the transition section by a sum of the height of the surface of the distance portion at a point in the transition section multiplied by first coefficient and the height of the surface of the near portion at this point multiplied by a second coefficient, wherein a sum of the first coefficient and the second coefficient equals one at every point in the transition section.

8. A method for creating a numerical representation of a bifocal spectacle lens having a distance portion, a near portion, and a transition section situated between the distance portion and the near portion, the method comprising:
optimizing the distance portion;
optimizing the near portion in view of an optical power for near vision;
determining or optimizing the transition section by creating a continuous transition between the distance portion and the near portion, wherein the transition section is determined or optimized after the distance portion and the near portion have been optimized; and
subsequently putting together the distance portion and the near portion with the transition section to form the numerical representation of the bifocal spectacle lens,
wherein the method is computer implemented,
wherein the distance portion is optimized in view of an optical power for distance vision,
wherein the distance portion and the near portion are optimized independently of one another,
wherein the transition section is determined by providing an overlap region between the distance portion and the near portion, and
wherein a surface of the overlap region is a linear combination of a surface of the distance portion and a surface of the near portion in the overlap region.

9. The computer implemented method as claimed in claim 8, further comprising:
adapting the transition section to the distance portion and the near portion such a that an at least continuously differentiable transition is created between the transition section and the distance portion and between the transition section and the near portion.

10. The computer implemented method as claimed in claim 8, wherein, for the purposes of optimizing the distance portion and the near portion, a numerical representation of a spectacle lens for distance vision and a numerical representation of a spectacle lens for near vision are optimized, and
wherein the numerical representation of the bifocal spectacle lens is created by virtue of being put together from a segment of the optimized numerical representation of the spectacle lens for distance vision, a segment of the optimized numerical representation of the spectacle lens for near vision, and the transition section.

11. The computer implemented method as claimed in claim 10, wherein
a numerical representation of a single vision spectacle lens finds use as a numerical representation of the spectacle lens for distance vision, and/or
a numerical representation of a single vision spectacle lens or a near vision comfort spectacle lens finds use as the numerical representation of the spectacle lens for near vision.

12. The computer implemented method as claimed in claim 8, further comprising:
putting together the distance portion, the near portion, and the transition section such that:
the distance portion and the near portion touch at exactly one contact point, wherein the optimization of the distance portion and of the near portion is carried out under the boundary condition that the distance portion and the near portion have the same thickness at the contact point, or
the distance portion, the near portion, and the transition section are put together such that the distance portion and the near portion in each case only adjoin the transition section.

13. The computer implemented method as claimed in claim 8, wherein the transition section, proceeding from a central section of the numerical representation of the bifocal spectacle lens, becomes wider toward an edge of the numerical representation of the bifocal spectacle lens.

14. The computer implemented method as claimed in claim 8, wherein the linear combination in the overlap region is given at any point of the transition section by a sum of the height of the surface of the distance portion at a point in the transition section multiplied by first coefficient and the height of the surface of the near portion at this point multiplied by a second coefficient, wherein a sum of the first coefficient and the second coefficient equals one at every point in the transition section.

15. A computer program for creating a numerical representation of a bifocal spectacle lens having a distance portion, a near portion, and a transition section situated between the distance portion and the near portion, the computer program being stored on a non-transitory storage medium and comprising instructions that, when executed on a computer, prompt the computer to: optimize the distance portion; optimize the near portion in view of an optical power for near vision; determine or optimizing the transition section by creating a continuous transition between the distance portion and the near portion, wherein the transition section is determined or optimized after the distance portion and the near portion have been optimized; and subsequently put the distance portion and the near portion together with the transition section to form the numerical representation of the bifocal spectacle lens, wherein the method is computer implemented, wherein the distance portion is optimized in view of an optical power for distance vision, wherein the distance portion and the near portion are optimized independently of one another, wherein, for the purposes of optimizing the distance portion and the near portion, a numerical representation of a spectacle lens for distance vision and a numerical representation of a spectacle lens for near vision are optimized, and wherein the numerical representation of the bifocal spectacle lens is created by virtue of being put together from a segment of the optimized numerical representation of the spectacle lens for distance vision, a segment of the optimized numerical representation of the spectacle lens for near vision, and the transition section.

16. A computer program for creating a numerical representation of a bifocal spectacle lens having a distance portion, a near portion, and a transition section situated between the distance portion and the near portion, the computer program being stored on a non-transitory storage medium and comprising instructions that, when executed on a computer, prompt the computer to: optimize the distance portion; optimize the near portion in view of an optical power for near vision; determine or optimizing the transition section by creating a continuous transition between the distance portion and the near portion, wherein the transition section is determined or optimized after the distance portion and the near portion have been 10 optimized; and subsequently put the distance portion and the near portion together with the transition section to form the numerical representation of the bifocal spectacle lens, wherein the method is computer implemented, wherein the distance portion is optimized in view of an optical power for distance vision, wherein the distance portion and the near portion are optimized independently of one another, wherein the transition section is determined by providing an overlap region between the distance portion and the near portion, and wherein a surface of the overlap region is a linear combination of a surface of the distance portion and a surface of the near portion in the overlap region.

17. A data processing system for creating a numerical representation of a bifocal spectacle lens having a distance portion, a near portion, and a transition section situated between the distance portion and the near portion, wherein the data processing system comprises:
a processor; and
at least one memory, wherein the processor is configured, based on instructions of a computer program stored in the memory, to:
optimize the distance portion;
optimize the near portion in view of an optical power for near vision;
determine or optimizing the transition section by creating a continuous transition between the distance portion and the near portion, wherein the transition section is determined or optimized after the distance portion and the near portion have been optimized; and
subsequently put the distance portion and the near portion together with the transition section to form the numerical representation of the bifocal spectacle lens,
wherein the method is computer implemented,
wherein the distance portion is optimized in view of an optical power for distance vision,
wherein the distance portion and the near portion are optimized independently of one another,
wherein, for the purposes of optimizing the distance portion and the near portion, a numerical representation of a spectacle lens for distance vision and a numerical representation of a spectacle lens for near vision are optimized, and
wherein the numerical representation of the bifocal spectacle lens is created by virtue of being put together from a segment of the optimized numerical representation of the spectacle lens for distance vision, a segment of the optimized numerical representation of the spectacle lens for near vision, and the transition section.

18. A data processing system for creating a numerical representation of a bifocal spectacle lens having a distance portion, a near portion, and a transition section situated between the distance portion and the near portion, wherein the data processing system comprises:
a processor; and
at least one memory, wherein the processor is configured, based on instructions of a computer program stored in the memory, to:
optimize the distance portion;
optimize the near portion in view of an optical power for near vision;
determine or optimizing the transition section by creating a continuous transition between the distance portion and the near portion, wherein the transition section is determined or optimized after the distance portion and the near portion have been optimized; and
subsequently put the distance portion and the near portion together with the transition section to form the numerical representation of the bifocal spectacle lens,
wherein the method is computer implemented,
wherein the distance portion is optimized in view of an optical power for distance vision,
wherein the distance portion and the near portion are optimized independently of one another,
wherein the transition section is determined by providing an overlap region between the distance portion and the near portion, and
wherein a surface of the overlap region is a linear combination of a surface of the distance portion and a surface of the near portion in the overlap region.

19. A non-volatile computer readable storage medium with instructions stored thereon for creating a numerical representation of a bifocal spectacle lens having a distance portion, a near portion, and a transition section situated between the distance portion and the near portion, wherein the instructions, when executed on a computer, prompt the computer to:
optimize the distance portion;
optimize the near portion in view of an optical power for near vision;
determine or optimizing the transition section by creating a continuous transition between the distance portion and the near portion, wherein the transition section is determined or optimized after the distance portion and the near portion have been optimized; and
subsequently put the distance portion and the near portion together with the transition section to form the numerical representation of the bifocal spectacle lens,
wherein the method is computer implemented,
wherein the distance portion is optimized in view of an optical power for distance vision,
wherein the distance portion and the near portion are optimized independently of one another,
wherein, for the purposes of optimizing the distance portion and the near portion, a numerical representation of a spectacle lens for distance vision and a numerical representation of a spectacle lens for near vision are optimized, and
wherein the numerical representation of the bifocal spectacle lens is created by virtue of being put together from a segment of the optimized numerical representation of the spectacle lens for distance vision, a segment of the optimized numerical representation of the spectacle lens for near vision, and the transition section.

20. A non-volatile computer readable storage medium with instructions stored thereon for creating a numerical representation of a bifocal spectacle lens having a distance portion, a near portion, and a transition section situated between the distance portion and the near portion, wherein the instructions, when executed on a computer, prompt the computer to:
optimize the distance portion;
optimize the near portion in view of an optical power for near vision;
determine or optimizing the transition section by creating a continuous transition between the distance portion and the near portion, wherein the transition section is determined or optimized after the distance portion and the near portion have been optimized; and
subsequently put the distance portion and the near portion together with the transition section to form the numerical representation of the bifocal spectacle lens,
wherein the method is computer implemented,
wherein the distance portion is optimized in view of an optical power for distance vision,
wherein the distance portion and the near portion are optimized independently of one another,
wherein the transition section is determined by providing an overlap region between the distance portion and the near portion, and wherein a surface of the overlap region is a linear combination of a surface of the distance portion and a surface of the near portion in the overlap region.

21. A bifocal spectacle lens comprising:

a distance portion;

a near portion; and a transition section situated between the distance portion and the near portion, wherein the transition section is configured to create a continuous transition between the distance portion and the near portion, wherein the distance portion and the near portion represent portions of spectacle lenses that were optimized and subsequently put together with the transition section, wherein the transition section has been determined or optimized after the distance portion and the near portion have been optimized, wherein iso-astigmatism lines of the spectacle lens are discontinuous, wherein the distance portion and the near portion represent portions of respective single vision spectacle lenses that were optimized independently of one another, wherein the transition section is an overlap region between the distance portion and the near portion, wherein the overlap region has a surface which is a linear combination of the surface of the single vision lens forming the distance portion and the surface of the single vision lens forming the near portion in the overlap region, wherein the linear combination is given at any point of the transition section by a sum of a height of the surface of the distance portion at a point in the transition section multiplied by a first coefficient and an individual height of the surface of the near portion at this point multiplied by a second coefficient, wherein the sum of the first coefficient and the second coefficient equals one at every point in the transition section.

22. The bifocal spectacle lens as claimed in claim 21, wherein the near portion and the distance portion touch at exactly one point of the bifocal spectacle lens.

* * * * *

UNITED STATES PATENT AND TRADEMARK OFFICE
CERTIFICATE OF CORRECTION

| | |
|---|---|
| PATENT NO. | : 11,372,263 B2 |
| APPLICATION NO. | : 17/566897 |
| DATED | : June 28, 2022 |
| INVENTOR(S) | : Markus Welscher and Ray Steven Spratt |

It is certified that error appears in the above-identified patent and that said Letters Patent is hereby corrected as shown below:

In the Specification

In Column 17, Line 18, change "with respect to a" to – with respect to $\alpha$ –

Signed and Sealed this
Sixteenth Day of May, 2023

Katherine Kelly Vidal
*Director of the United States Patent and Trademark Office*